United States Patent [19]
Akiyama et al.

[11] Patent Number: 5,737,415
[45] Date of Patent: Apr. 7, 1998

[54] DATA MANAGEMENT MODULE, DATA REPRODUCTION MANAGEMENT DEVICE AND DATA REPRODUCTION MANAGEMENT SYSTEM

[75] Inventors: Ryota Akiyama; Makoto Yoshioka, both of Kawasaki, Japan

[73] Assignee: Fujitsu Limited, Kawasaki, Japan

[21] Appl. No.: 509,226

[22] Filed: Jul. 31, 1995

[30] Foreign Application Priority Data

Aug. 10, 1994 [JP] Japan ................................. 6-219372
Sep. 20, 1994 [JP] Japan ................................. 6-225228

[51] Int. Cl.⁶ ....................................................... H04L 9/00
[52] U.S. Cl. ................................................. 380/4; 380/25
[58] Field of Search ................................ 380/3, 4, 23, 25

[56] References Cited

U.S. PATENT DOCUMENTS

| | | |
|---|---|---|
| 4,247,106 | 1/1981 | Jeffers et al. . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,633,388 | 12/1986 | Chiu . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Cruts et al. . |
| 4,787,050 | 11/1988 | Suzuki . |
| 4,816,653 | 3/1989 | Anderl et al. . |
| 4,816,654 | 3/1989 | Anderl et al. . |
| 4,817,140 | 3/1989 | Chandra et al. . |
| 4,864,516 | 9/1989 | Gaither et al. . |
| 4,879,645 | 11/1989 | Tamada et al. . |
| 4,949,257 | 8/1990 | Orbach . |
| 4,977,594 | 12/1990 | Shear ........................................... 380/4 |
| 4,999,806 | 3/1991 | Chernow et al. . |
| 5,006,849 | 4/1991 | Baarman et al. . |
| 5,008,814 | 4/1991 | Mathur . |
| 5,014,234 | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |

(List continued on next page.)

FOREIGN PATENT DOCUMENTS

| | | |
|---|---|---|
| 0536825A1 | 4/1993 | European Pat. Off. . |
| 59-140562 | 8/1984 | Japan . |
| 2-112982 | 4/1990 | Japan . |
| WO88/02960 | 4/1988 | WIPO . |
| WO90/02382 | 3/1990 | WIPO . |

OTHER PUBLICATIONS

Japanese Patent Laid–Open Publication No. 57-127249, Aug. 7, 1982 (equivalent to Japanese Patent Publication No. 61-22815).
Japanese Patent Laid–Open Publication No. 5-89363, Apr. 9, 1993.
Japanese Patent Laid–Open Publication No. 5-266575, Oct. 15, 1993.
Japanese Patent Laid–Open Publication No. 5-298085, Nov. 12, 1993.
Japanese Patent Laid–Open Publication No. 6-95871, Apr. 8, 1994.

*Primary Examiner*—David C. Cain
*Attorney, Agent, or Firm*—Staas & Halsey

[57] ABSTRACT

The present invention was developed in order to provide a software management module incorporated in hardware or freely attachably/detachably set therein for encrypted software data to be obtained from software storing media or communications, wherein this software management module is provided with a function for decoding encrypted software, and an authorization control portion for managing authorization for decoding.

16 Claims, 23 Drawing Sheets

U.S. PATENT DOCUMENTS

| | | |
|---|---|---|
| 5,103,476 | 4/1992 | Waite et al. . |
| 5,166,866 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,247,575 | 9/1993 | Sprague, et al. ............................ 380/9 |
| 5,267,171 | 11/1993 | Suzuki et al. . |
| 5,319,705 | 6/1994 | Halter et al. ................................. 380/4 |

| SOFTWARE ID | CHARGING BALANCE | TIME STAMP |
|---|---|---|
| ABC 001 | 36000 | 654321 |
| DEF 030 | 5000 | 871592 |
| GHI 330 | 150 | 110542 |
| | | |
| VSY 245 | 650 | 33251 |
| XYZ 003 | 2103 | 29875 | ns

DATA MANAGEMENT MODULE, DATA REPRODUCTION MANAGEMENT DEVICE AND DATA REPRODUCTION MANAGEMENT SYSTEM

BACKGROUND OF THE INVENTION

With the development of such large-capacity storage media as a CD-ROM and the like and large-capacity and high-speed communication technologies as B-ISDN or the like, there are plans to distribute image data of static/moving pictures and audio data as digital data, as well as of course computer programs, using these means.

Specifically, visual media works, etc., which have conventionally been supplied as video tapes, are now sold as CD-ROMs, and games using the interactive property (bidirectional property) of the CD-ROM are now being distributed on the market.

The same is true for satellite communications and cable/radio/optical communication lines, via which visual media works, etc., can now be sent to users.

Since these kinds of digital data can be copied to other media very easily and there is no possibility of reduction of data quality as in the case of repeatedly copying analog data, it is extremely easy to perform data copying without deterioration in quality. On the other hand, however, the possibility is high that the profits of writers and data programmers will suffer due to such actions. In other words, as long as large-capacity and rewritable optical magnetic disks or magnetic disk devices are provided, it is easy to copy contents received via CD-ROM or communication lines with a minimum knowledge of commands.

Currently, it is most often the case that renting of these kinds of digital data media is prohibited for the reason that sufficient security is impossible.

Moreover, as such software, including movies, programs and so on, is very expensive, more often than not, end users hesitate to buy them until they are sure they are really what they want and operable on the hardware they own.

In order to deal with such a situation, a new data distribution system has been realized, wherein a CD-ROM storing a number of data with functional limits attached is sold inexpensively and codes for releasing such limits are reported to the end users if they pay fees for the data they want.

It has been found, however, that this data distributing system does not sufficiently reflect data characteristics.

More specifically, in the system for sending codes to release the functional limits, since the fees therefor must be paid in a lump sum, they are very high, and when the end user wishes to see only one scene of a movie or use table calculation software, for example, for only for one week, it is difficult to manage fees based on the amount of utilization.

In order to solve such problems, a system has been disclosed in Japanese Published Examined Patent Application No. 6-19707 wherein, when software which can be charged for is used, usability fees are previously stored in an IC card, the usability fees of the IC card are recorded in a system, and the charge is subtracted from the balance by the system whenever the software is utilized.

Further, in Japanese Patent Application No. 6-96871 of the applicant of the present invention, a system is disclosed wherein data utilization time is managed by providing a rewritable area in such storage media as CD-ROMs or the like.

The present invention relates to a technology effective for and applicable to a system for distributing data of visual works, etc., in particular digitized data and computer program data. The invention provides a data management system allowing better security and more efficient amount-based charging management according to the amount of data utilization, without complicating the data storage media.

SUMMARY OF THE INVENTION

A data management module according to the present invention is for selectively reproducing specified encrypted data including characters, graphics, images or sounds (encrypted software data).

This data management module includes an input portion for inputting the encrypted data, an authorization control portion for giving authorization to decode specified encrypted data, a decoding portion for decoding the encrypted data input by the input portion with authorization given by the authorization control portion, and an output portion for outputting the data decoded by the decoding portion.

According to the present invention, encrypted data to be provided to the input portion may be data from such storage media as a CD-ROM, an MO or the like, or data received via a satellite circuit or normal communication lines on the ground. As for the types of data, any data such as characters, graphics, images and sounds, not to mention programs, may be used.

The decoding portion includes a so-called DES circuit (Data Encryption Standard) and is controlled by the authorization control portion which includes a CPU, etc.

The decoding portion may be provided with a mode identifying portion so as to enable an optimal decoding mode in accordance with data characteristics.

The authorization control portion may be made to enable decoding at the decoding portion only when there is a balance remaining referring to a charge data storage portion. In this case, amount-based charging is executed with respect to the charge data storage portion depending on data reproduction. That is, the authorization control portion executes subtraction of count values of the charge data storage portion.

Thus, according to the present invention, without complicating data storage media, it is possible to perform data management which enables better security and more efficient fee-charging management.

DESCRIPTION OF THE PREFERRED EMBODIMENT

Prior to a detailed description of the preferred embodiment, the gist of the present invention will be described.

Figure 1:
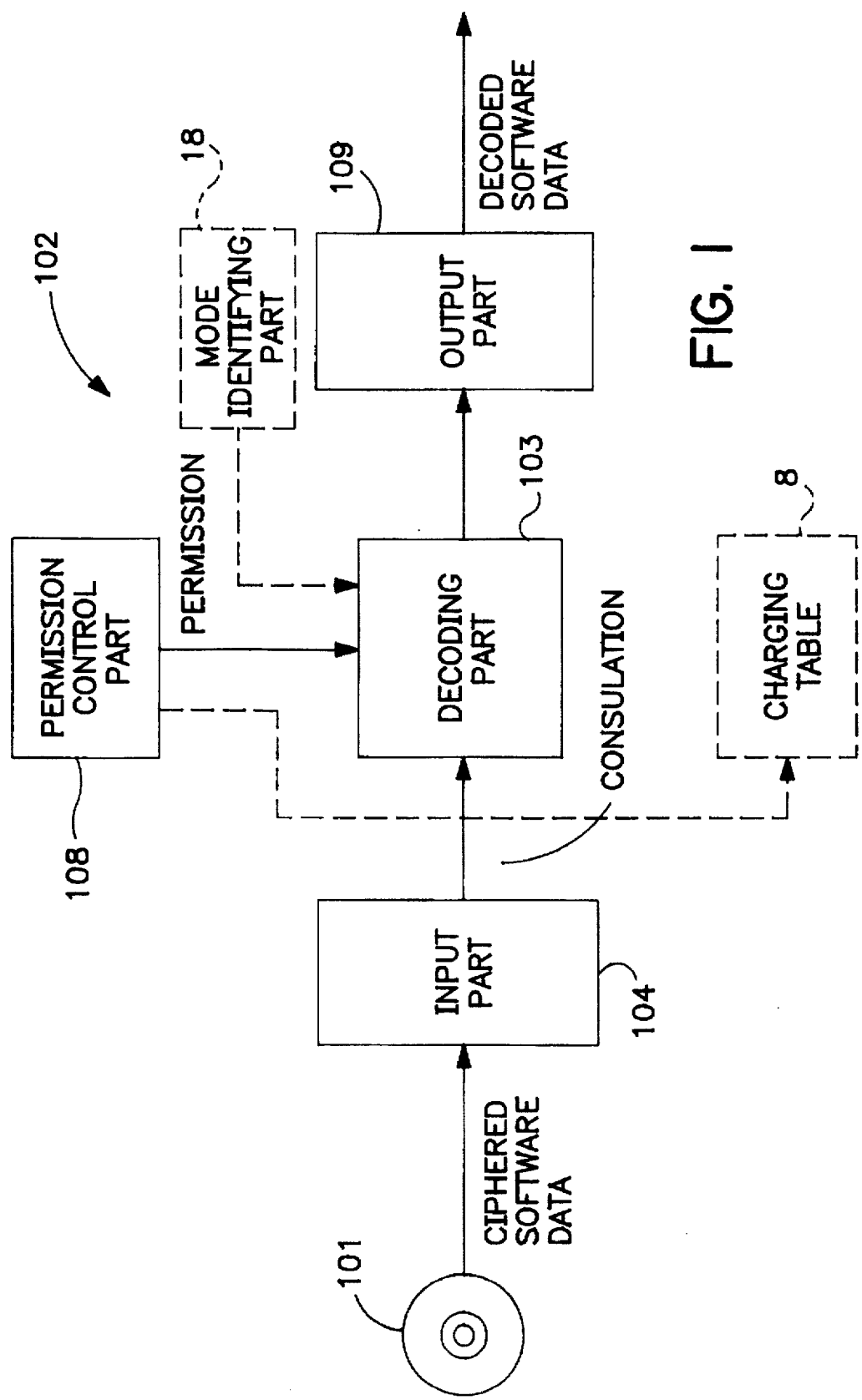
FIG. 1 is a block diagram illustrating the principle of the present invention.

As shown by the diagram of the principle of the present invention in FIG. 1, a data management module according to the present invention is for selectively reproducing specified encrypted data (encrypted software data) such as characters, images, sounds and so on, and for collecting (beforehand) usage fees according to the number of reproduced data items, amount of data or amount of time.

Figure 24:
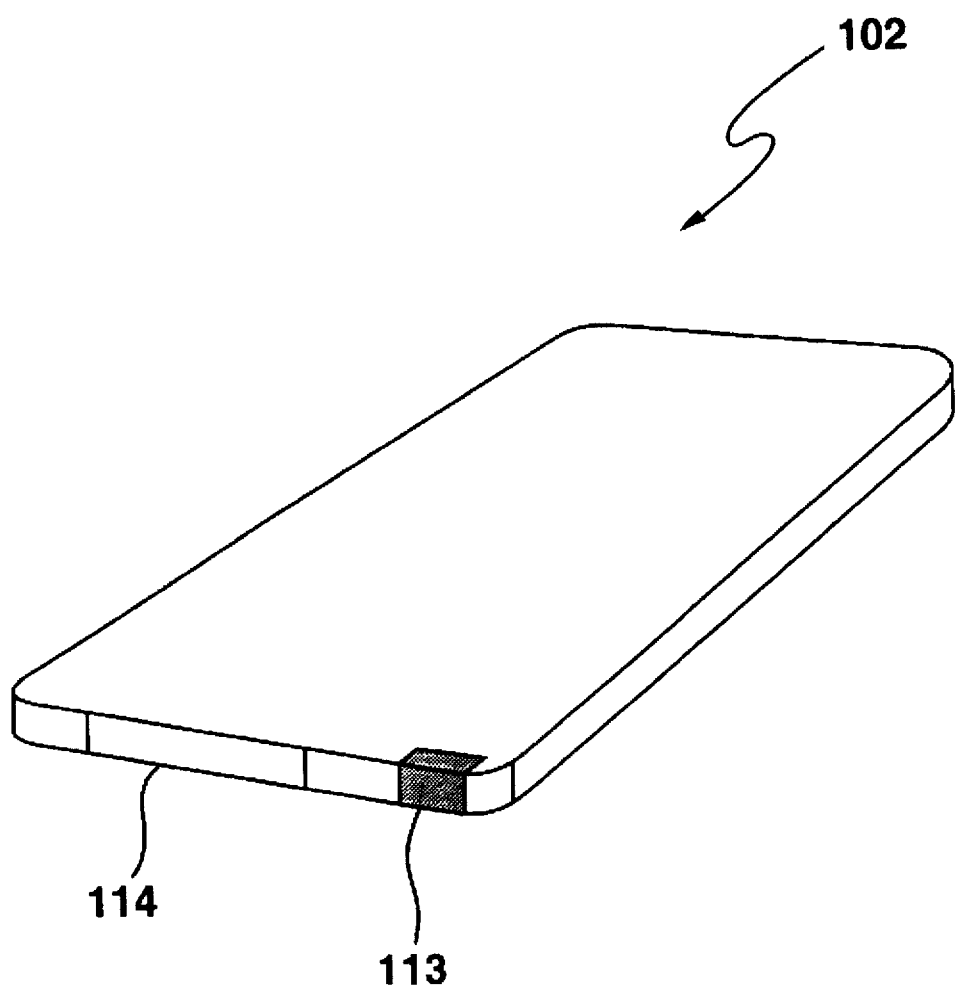
FIG. 24 is a view showing the appearance of a data management system made in card form.

The appearance of a data management module 102 is shown in FIG. 24. As shown in this drawing, the data management module 102 is made in card form conforming to PCMCIA. Though not shown in the drawing, on one end surface thereof a connection terminal is provided which is attachable to the slot of a data reproducing device. On the other end surface a battery housing portion 114 and a display portion 113 are provided.

As shown in FIG. 1, encrypted data to be provided to an input portion 104 may be data from a data storage medium such as a CD-ROM 101 or data received via satellite or normal communication lines. As to types of data, any data such as characters, graphics, images or the like, not to mention programs may be used.

At the stage next to the input portion 104 a decoding portion 103 for decoding the encrypted data is provided. This decoding portion 103 includes a so-called DES circuit (Data Encryption Standard) and is controlled by an authorization control portion 108 having a CPU, etc.

The decoding portion 103 may be provided with a mode identifying portion (see FIG. 3) so as to allow selection of an optimal decoding mode from among various decoding modes, according to data characteristics.

Meanwhile, the authorization control portion 108 may be made to give authorization for decoding at the decoding portion 103 only when there is still a balance remaining with reference to the charge data storage portion 8. In this case, amount-based charging is executed with respect to the charge data storage portion 8 according to data reproduction. That is, the authorization control portion 108 executes subtraction of the count values of the charge data storage portion 8.

Figure 23:
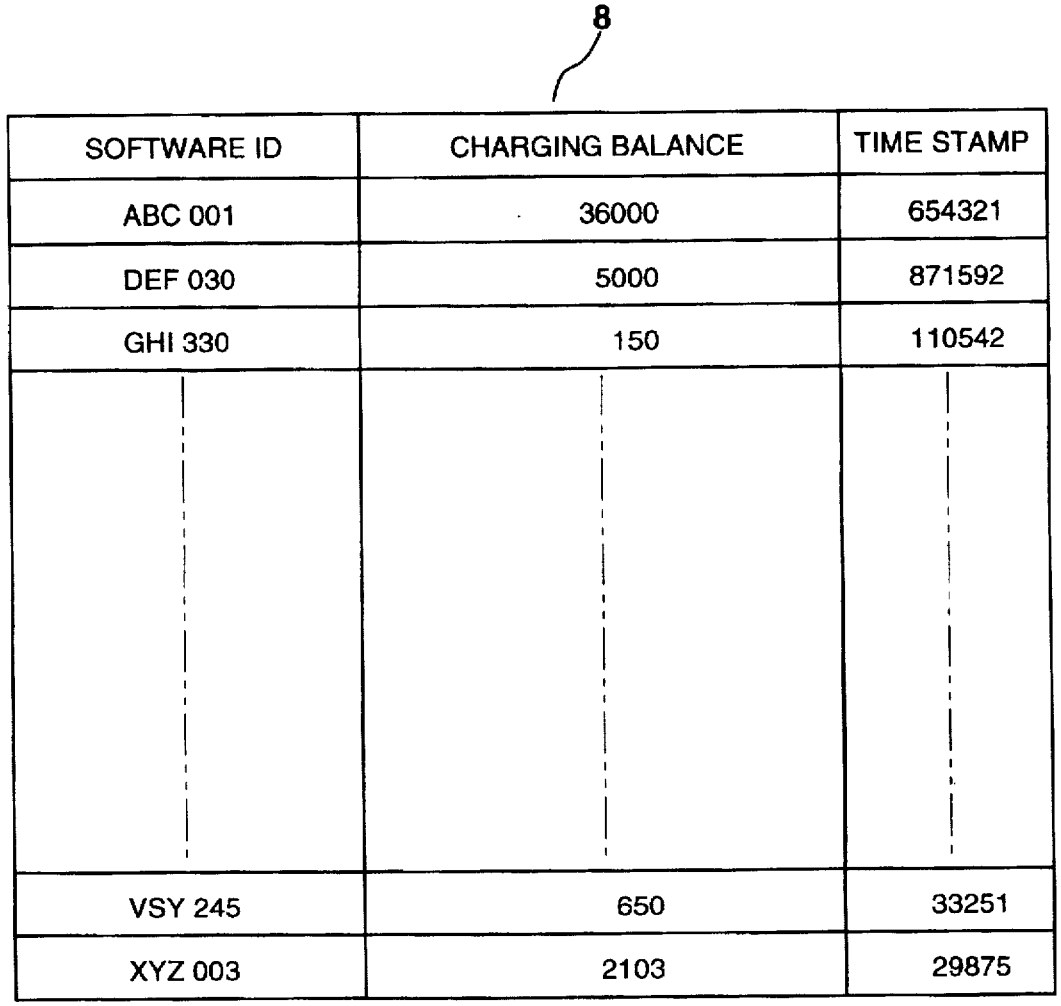
FIG. 23 is a view showing the concept of a charge data storage portion of the present embodiment.

The construction of the charge data storage portion 8 is shown in FIG. 23. As shown in this drawing, the charge data storage portion 8 is capable of recording software IDs and balances in table form. The software ID is an ID indicating the content of the data; more specifically, the titles of movies, etc., are recorded in coded forms therein.

In the authorization control portion 108, subtraction is made from a balance recorded in a software ID, corresponding to the amount to be decoded.

When the balance becomes 0, the nonexistence of the balance is reported to an output portion 109. At the output portion 9, where image data are included in the decoded data to be output, a message indicating that there is no balance remaining may be superimposed on a screen. Also, where the data to be decoded is audio data, balance reduction or insufficiency may be reported by superimposing such information on the data to be reproduced as audio information.

Further, where there is an insufficient balance regarding the software ID, balances recorded in other software IDs may be transferred, by means of the user setting an instruction beforehand, to the balance of the present software ID.

In this way, according to the present invention, as the authorization control portion 108 and the decoding portion 103 are provided within the module 102 attached to the data reproducing device, very safe data charging is allowed.

Furthermore, where the charge data storage portion 8 is also housed within this module 102 and data relating to this charging (user data) is output to the exterior, by providing an encrypting portion, encrypting is carried out to improve security. The decoding portion 103 can function as this encrypting portion.

Still further, by providing input and output buffers for the decoding portion 103, input and output of data can be executed in parallel, thereby attaining high speed decoding.

The preferred embodiment will be described in detail hereinbelow.

Figure 12:
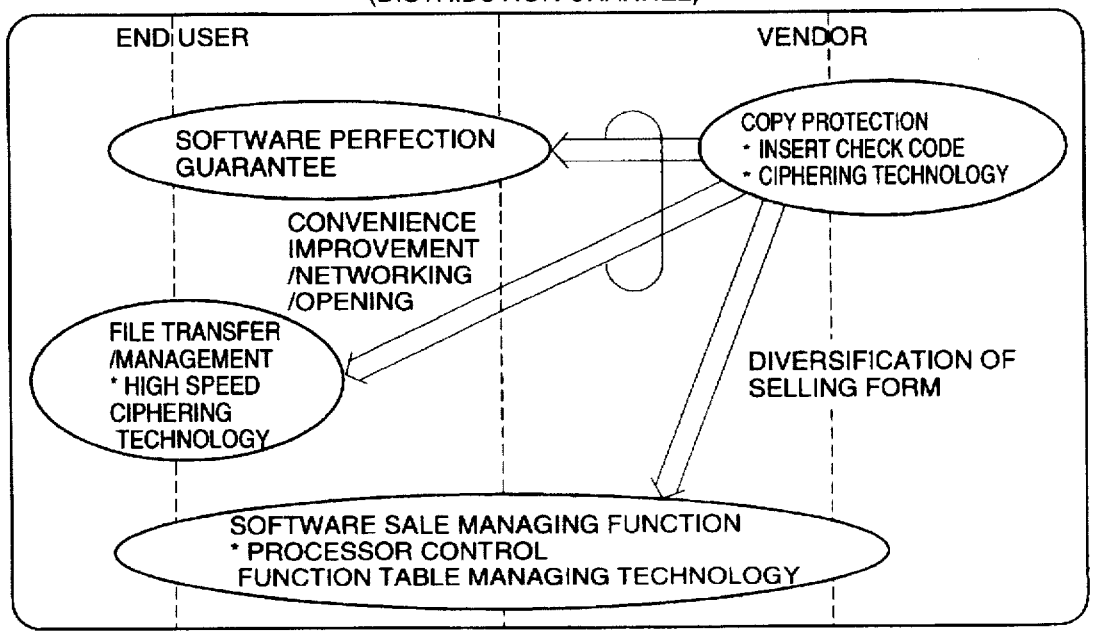
FIG. 12 is an explanatory diagram showing the concepts of techniques and roles required by users, according to the present invention.

FIG. 12 is a view showing the concept of techniques and roles required by users (vendor: control center, end user: data reproducing device, distribution channel) in a super distribution system proposed by the present invention.

As shown in the drawing, problems for the vendors relating to copy protection such as check code insertion, encrypting techniques or the like are important, while for the end users the integrity of data security by adopting checksum codes and file transfer/management by high-speed encrypting techniques is important. On the other hand, at the distributing channel a data sale management function will play an important role. The embodiment will be described with these points in mind.

Figure 2:
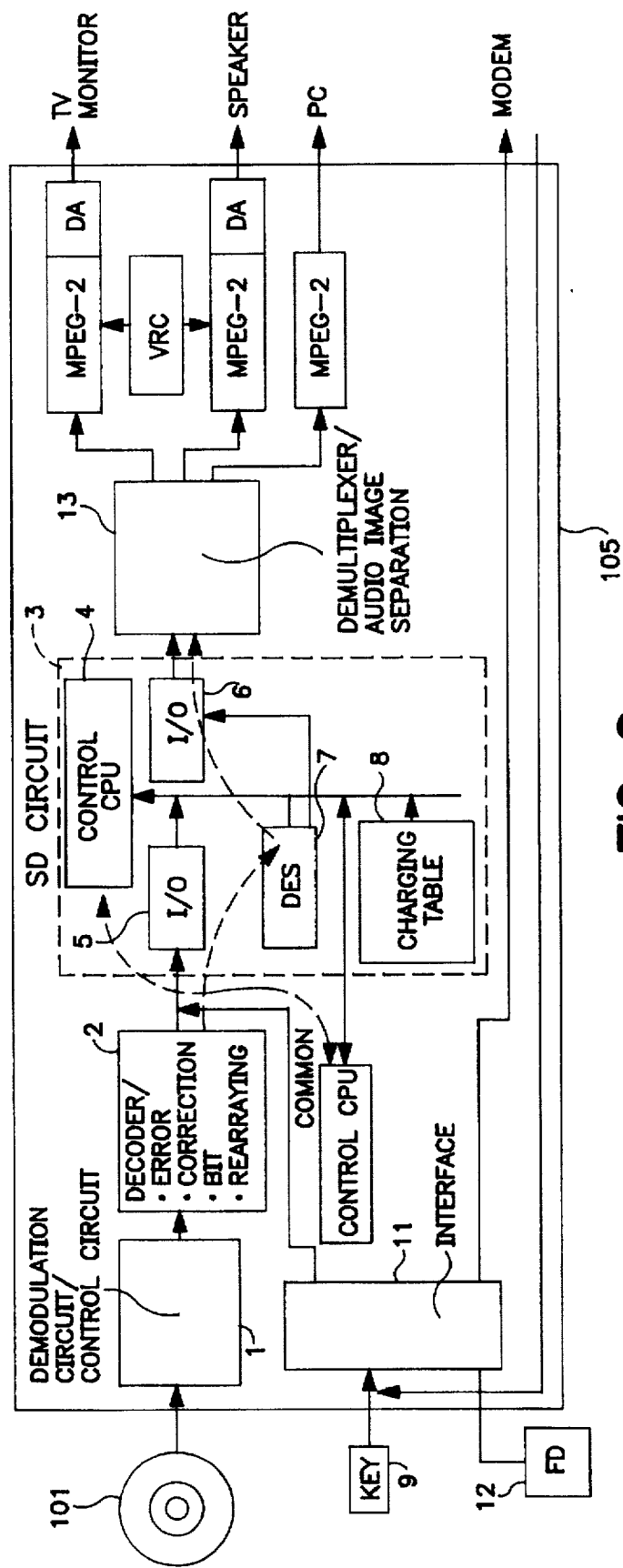
FIG. 2 is a block diagram illustrating the functions of the data reproducing device according to the present embodiment.

FIG. 2 is a block diagram showing the functional structure of the data reproducing device used in the present embodiment.

For convenience of description, it is assumed that encrypted data to be input are stored in a CD-ROM, an MO or the like in the present embodiment. However, data which are provided as communication data via a broadcasting satellite circuit, a normal line on the ground, communications or optical or metalic communications may be used.

(STRUCTURE OF DATA REPRODUCING DEVICE)

As Shown in FIG. 2, the portion surrounded by broken lines (SD circuit 3) indicates a data management module 102. This data management module 102 may be in a PCMCIA card shown in FIG. 24 or fixed to the data reproducing device in board or card form.

In the drawing, 1 indicates a demodulation circuit/control circuit provided with a function for demodulating image/audio data of MPEG standard stored in a CD-ROM and sending the data to a decoder 2.

The decoder 2 is for executing error correction and bit rearranging and transferring of image/audio data (encrypted data) at up to 2 MB/sec. (1 MB/sec. on average) to the SD circuit 3.

In the data management module 102, that is, the SD circuit 3, image/audio data (encrypted data) received through an I/O (5: input portion 104) are decoded by DES (Data Encryption Standard) 7 which functions as a decoding portion 103 and sent through an I/O (6: output portion 109) to a demultiplexer 13 outside the SD circuit 3. In the demultiplexer 13, audio data and image data are separated and sent to an MPEG processing portion (MPEG-2). The MPEG processing portion (MPEG-2) is provided with a function for expanding compressed MPEG standard image/audio data, and when audio and video are separated and output, synchronization between the image data and the audio data is adjusted by means of a synchronization control portion (VRC).

After the data are D/A converted, they are output to a TV monitor or speaker.

On the other hand, where data are output to a computer (PC), MPEG data may be output as is as digital data. Where these data are programs, they may be output through an SCSI interface, not shown in the drawing.

Further, transfer and reception of these data are shared by a control CPU 10 within a data reproducing device as an authorization control portion and a control CPU 4 within the SD circuit 3. However, the control CPU 10 only may be used as it can function as the control CPU 4 within the SD circuit 3.

For the DES 7 in the present embodiment "46DATA ENCRYPTION STANDARD NIST" made by ??FIP'S PUB?? is used, while for the MPEG processing portion "ISO/IEC CD 13818'1-3" is used.

(FUNCTIONS WITHIN THE SD CIRCUIT)

In the SD circuit 3, the control CPU 4 functions as an authorization control portion 108 and identifies whether decoding in the DES 7 relating to encrypted data read by a CD-ROM 101 is authorized or not.

When performing this identification, the control CPU 4 first reads the ID of software to be reproduced from the CD-ROM 101 and consults a charge data storage portion 8. Here, it will perform inspection to confirm whether it is the same software ID as is registered in the charge data storage portion 8.

Then, only when there is still a balance remaining in the registration area of the software ID is decoding in the DES 7 executed.

The structure of the charge data storage portion 8 is shown in FIG. 23. As shown in this drawing, in the charge data storage portion 8, software IDs and balances can be recorded in table form. The software ID is an ID indicating the content of data; more specifically the titles of movies, etc. are recorded therein in coded form.

In the authorization control portion 108, subtraction is made from a balance recorded in the ID of software to be decoded, corresponding to the amount to be decoded.

Then, where the value of the balance reaches 0 during decoding, it is reported to the output portion 109, where the processes described hereinbelow are performed.

For example, where image data are included in decoded data to be output, a message indicating that there is no balance remaining is superimposed on the screen. Also, if the data to be decoded are audio data, they are superimposed on the reproduced data and reduction or insufficiency of balance is reported as audio information.

Further, where there is insufficient balance regarding the software ID, balances recorded in other software IDs may be transferred, by means of the user setting an instruction beforehand, to the balance of the present software ID.

Figure 7:
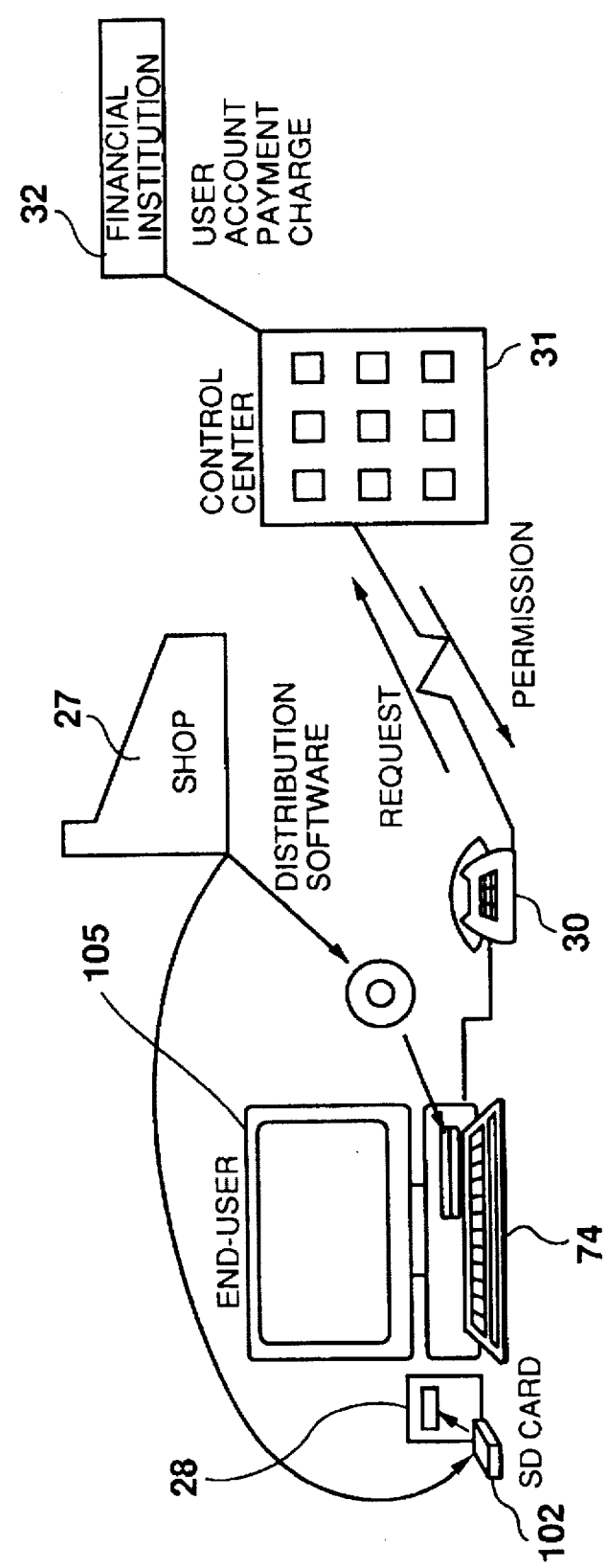
FIG. 7 is an explanatory diagram showing an outline of the entire data distribution system according to the present invention.

When wishing to renew this balance as shown in FIG. 7, the data management module 102 which is provided as a card medium is taken to a shop, etc., and the balance of the charge data storage portion 8 will be increased by paying fees.

Alternatively, the balance may be increased by receiving charge addition data as code data with electronic signatures given at a financial institution 32 or at a control center 31 by line transmission or orally by telephone, these possibly being input by the user via a keyboard 9. The charging addition data received by the user is assured safety by the electronic signature, the user not being allowed to change them. That is, the control CPU 4 certifies the electronic signature of the input charge addition data, and when these do not coincide, it will reject additional recording in the charge data storage portion 8.

Further, according to the present invention, the charge data storage portion 8 is not essential, and thus charging value data may be output to a medium such as a floppy disk or the like. Where user data relating to charge values data etc. are output to the exterior, however, the control CPU 4 will encrypt the charging value data at the DES 7 and output them as encrypted data.

This means that when charge value data are output to the exterior, the DES 7 will function as an encrypting portion.

Output of charge value data is not limited to a floppy disk but, as shown in FIG. 7, may be output to a control center 31 via a communication line.

(DETAILS OF THE DES)

Figure 3:
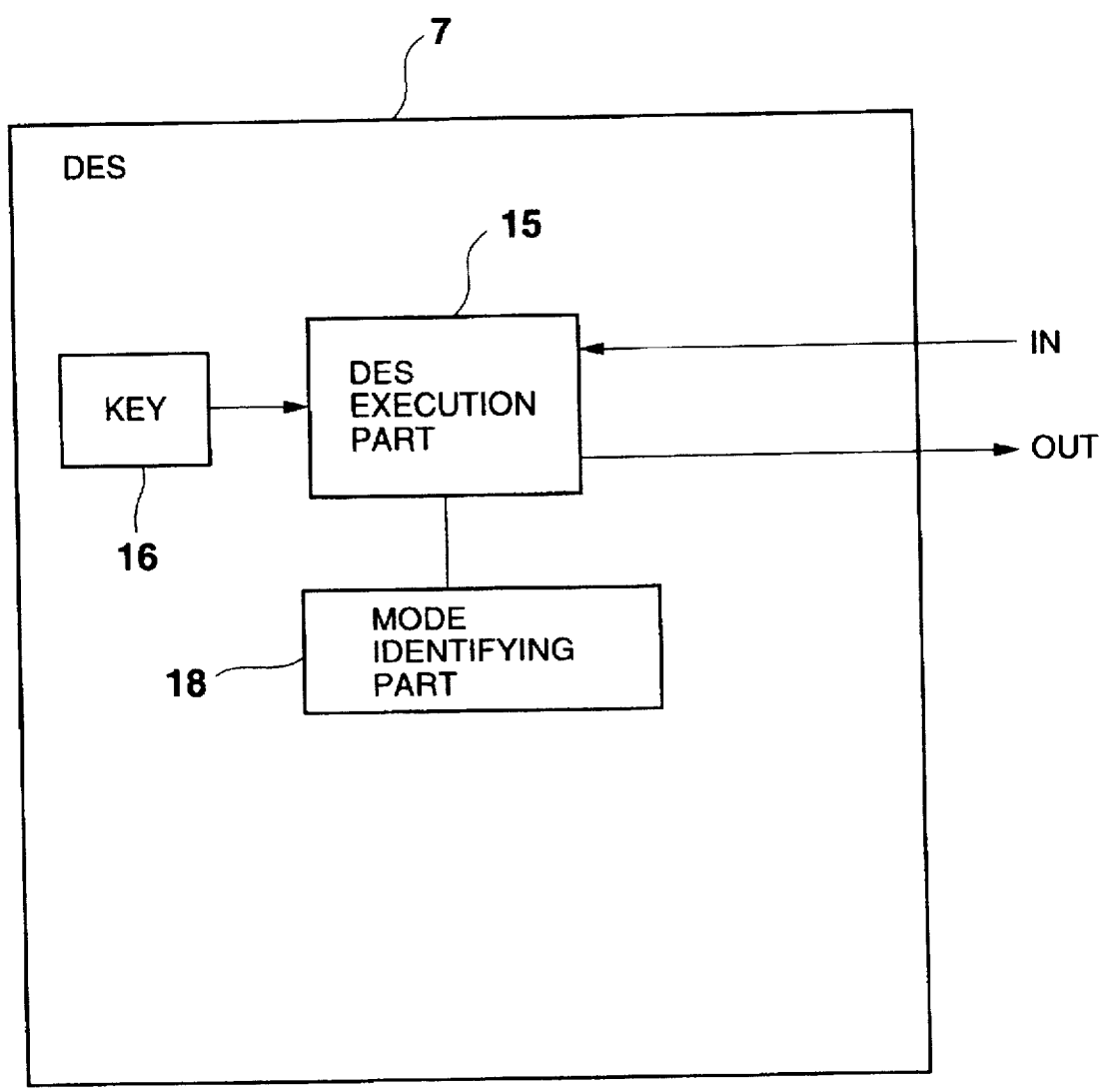
FIG. 3 is a block diagram showing the internal functions of the DES of the present embodiment.

FIG. 3 is a view illustrating the structure of the DES 7. As shown in this drawing, the DES 7 includes a DES execution portion 15 (executed by the control CPU 4), and input data (IN) are decoded by key data 16 and output as output data (OUT).

In the present embodiment, the DES 7 includes a mode identifying portion 18, this portion 18 being provided with a function for selecting an optimal mode from a plurality of DES modes and transmitting it to the DES execution portion 15.

(DESCRIPTION OF DES MODES)

A typical logic among the DES modes will be described hereinbelow.

Figure 4:
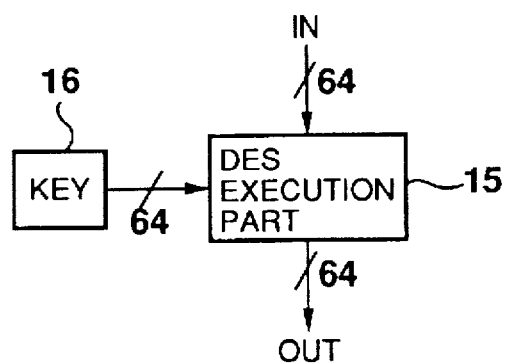
FIGS. 4A–4D are explanatory diagrams showing various DES modes.
Figure 4:
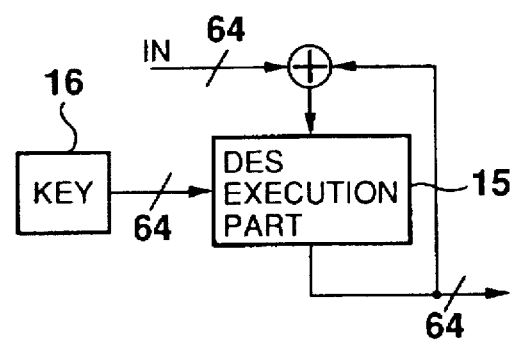
Figure 4:
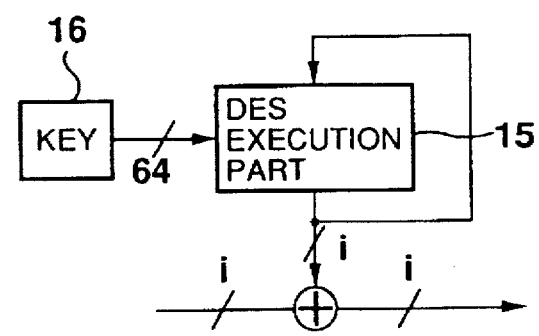
Figure 4:
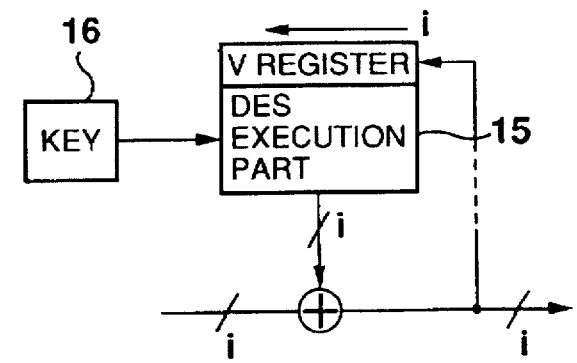

FIG. 4A is a view showing a basic ECB mode, wherein in the DES execution portion 15 an input data string of 64 bits is encrypted (or decoded) as an output data string of 64 bits by key data 16 of 64 bits.

FIG. 4B is a view showing a CBC mode, wherein after an input data string of 64 bits is encrypted (or decoded) by key data 16 of 64 bits at the DES execution portion 15, it is returned and input again to the DES execution portion 15. This is a system for outputting the last results gained by feedback until all data are input and suited to data processing of files, etc.

FIG. 4C is a view showing an OFB mode, which is suited to communication data in which errors are caused easily generated, and suited to audio data wherein only one error influences other parts of data.

FIG. 4D is a view showing a CFB mode, which is suited to self-synchronizing type data. The mode identifying portion 18 reads the optimal mode from among these modes stored in a mode table 20 by analyzing data forms, etc., and sends it to the DES execution portion 15. At the DES execution portion 15, encrypting/decoding are performed based on the mode thus selected.

(HIGH-SPEED ARITHMETIC PROCESSING OF THE DES EXECUTION PORTION)

Figure 5:
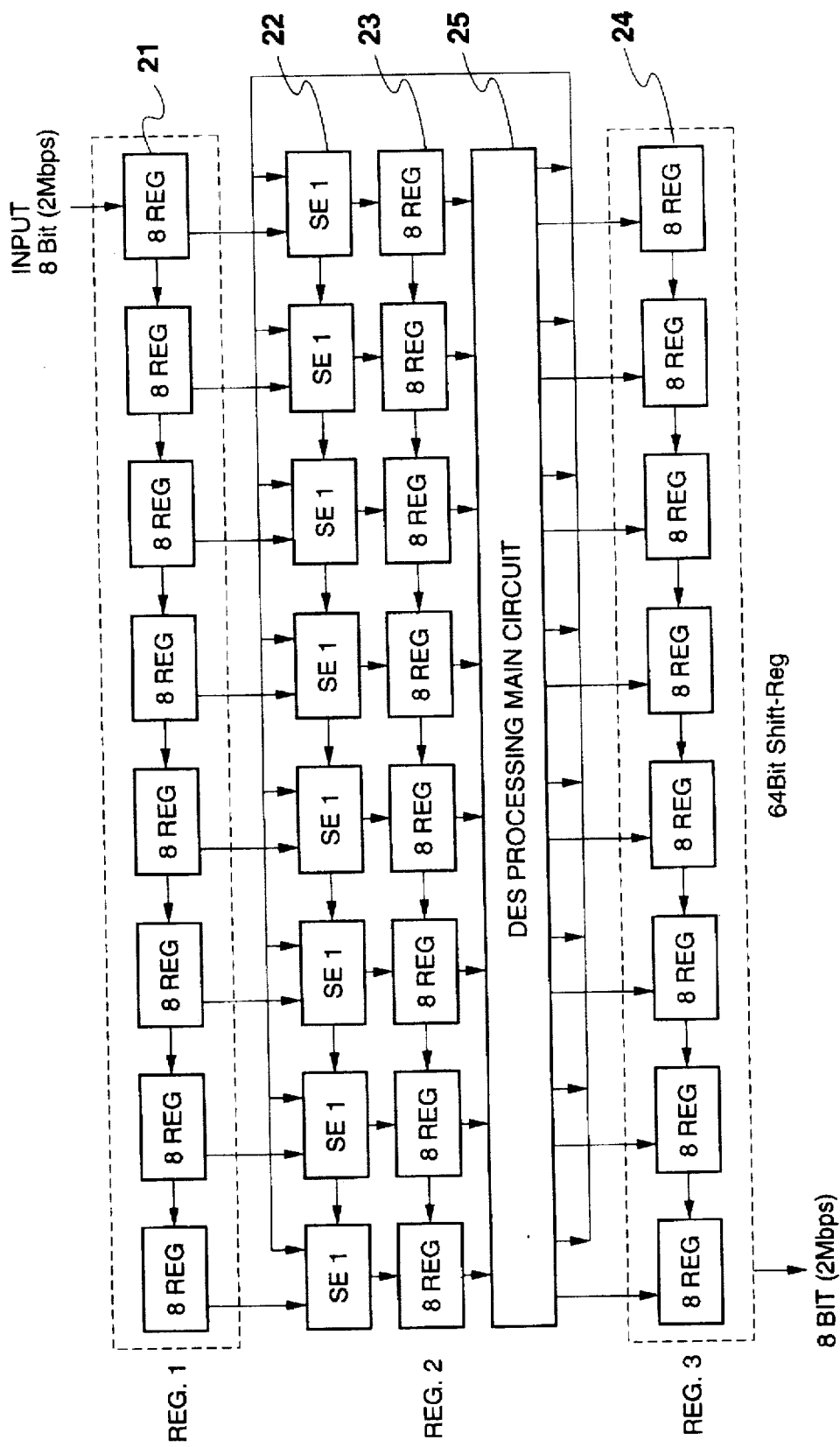
FIG. 5 is a block diagram showing the hardware structure of a DES execution portion.

FIG. 5 is a block diagram showing the hardware structure of the DES execution portion 15.

In this drawing, on the input side as an input buffer a shift register (input register 21: REG 1) of 64 bits having 8 connected registers of an 8 bit structure is disposed, and at the next stage a selector SE 1 is disposed. The selector SE 1 allows selective inputting of either outputs from a DES processing main circuit 25 (described later) or those from the shift register 21.

At a stage next to the selector se 1 a register 23 (REG 2) of 8 bits is disposed, and on a portion next to it the DES processing main circuit 25 is arranged. This DES processing main circuit 25 functions as the DES execution portion 15. That is, in the DES processing main circuit 25 various DES modes described earlier with reference to FIGS. 4A–4D are recorded as a ROM (Read Only Memory), and by an instruction from the control CPU 4 the logic of an optimal DES mode is selected and decoding is carried out.

The output of the DES processing main circuit 25 is branched to the selector SE 1 and an output register 24 (REG 3) as an output buffer. Then, the output of the output register 24 (REG 3) is used as the last encrypted or decoded data.

Figure 6:
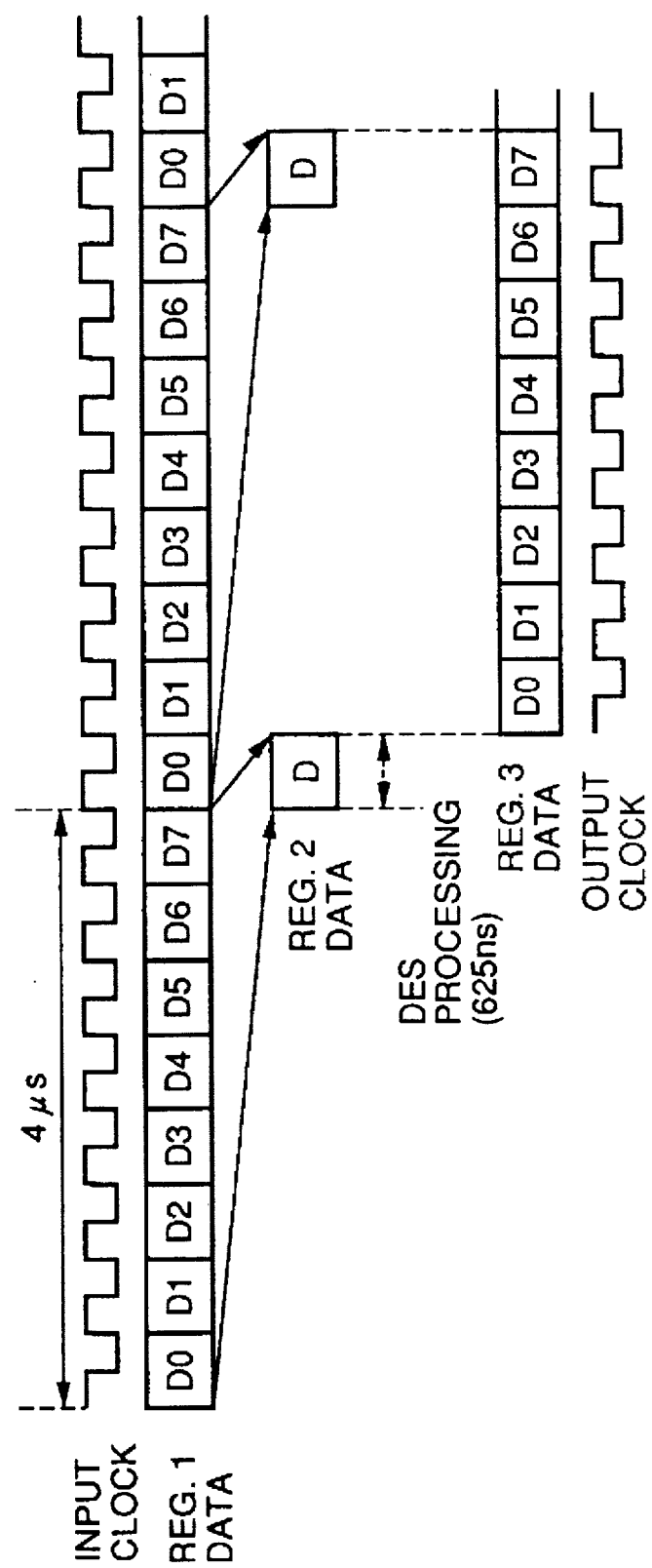
FIG. 6 is an explanatory diagram showing the process sequence of the DES execution portion.

The sequence of this processing is shown in FIG. 6.

In FIG. 6, the output of the input register 21 is subjected to DES processing at the first clock timing of a next cycle as an output from the register 23. Then, at a next clock timing it is output from the register 24. At the time of output from this output register 24, on the input side encrypted data of a next cycle will be taken from the input register 21.

In this way, according to the present embodiment, by providing the input register 21 as an input buffer and the output register 24 as an output buffer, independent and continuous execution of input of encrypted data and output of decoded data is possible. Thus, it is also possible to carry out encrypting and decoding at a speed higher than in the conventional case where input and output are cyclically switched at the DES.

(ENTIRE IMAGE OF THE DATA DISTRIBUTION STATE OF THE PRESENT INVENTION)

FIG. 7 is a view showing one example of the entire image of data distribution to be realized according to the present invention.

In the present embodiment, data are shipped from a shipping center (here, it is assumed for the purpose of convenience that a control center may also play the role of a shipping center) to a distribution channel with encrypted data stored in a CD-ROM.

The end user goes to a shop 27 (mail order is possible) and buys the CD-ROM as a data storage medium 101. At the same time, the end user buys a data management module 102 made in card form as an SD card.

A plurality of encrypted software data are stored in the CD-ROM. More specifically, according to the present invention, data stored in the CD-ROM are all encrypted, and when decoding and reproducing these it is essential to use the SD card as the data management module 102 to ensure security. Also, the SD card is fully equipped with a fee collecting system based on the amount of data to be used. Thus, it is meaningless to copy encrypted data stored in the CD-ROM itself in other media, making it impossible to reduce the profits of the data providers if the fee collecting system is fully provided corresponding to the amount to be used when a rental system of CD-ROMS is adopted.

When wishing to reproduce data stored in the CD-ROM (101) by one's own data reproducing device 105, the end user must first insert the SD card (102) into a card drive device 28 and load the CD-ROM (101) on the data reproducing device 105.

Then, by starting a communication application (this application may one provided as an operation application) installed in the data reproducing device 105, the end user will transmit a request for using the desired software data to the control center 31 from a modem (modulator) incorporated in the data reproducing device 105 through a domestic telephone 30. In turn, the control center 31 will send data made by encrypting authorization commands (key data) to the user's data reproducing device 105.

The data reproducing device 105 which has received the authorization commands will read the CD-ROM 101 and sequentially decode the necessary data through the decoding portion 103 of the SD card.

At the same time, the control CPU 4 will count the amount of decoded data or the time required for decoding and subtract a value corresponding to the software ID from the charge data storage portion 8. Then, until the time when the balance thereof becomes "0", decoding of the encrypted data will be continued.

Figure 8:
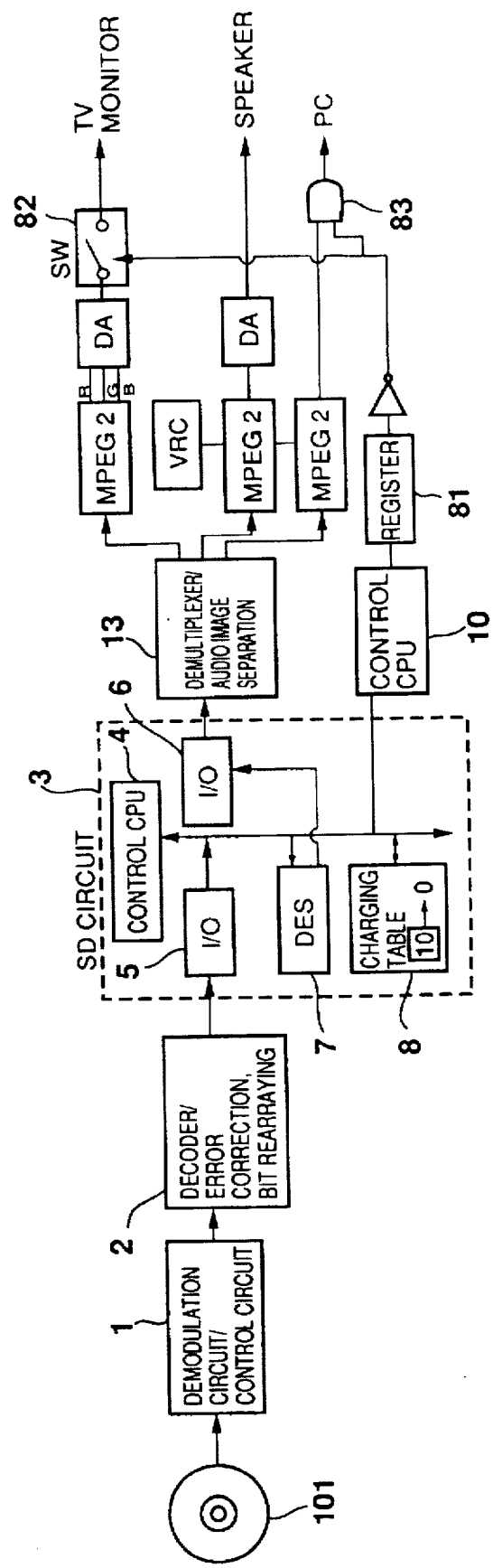
FIG. 8 is a diagram of the hardware structure for terminating output according to the balance of the charge data storage portion of the present embodiment.

Here, when the balance value of the charge data storage portion becomes "0", outputting of the decoded data is terminated. A hardware structure for realizing this output termination is shown in FIG. 8.

In this drawing, when the balance in the charge data storage portion becomes "0" and this is detected, the control CPU 3 which has been monitoring the charge data storage portion 8 will report this data to the control CPU 10 within the data reproducing device 105. Based on this report, the control CPU 10 changes the value held in a register 81 and closes an AND circuit (AND 83) and an analog switch (SW 82) provided at the output stages to a TV monitor and a computer (PC). In this way, even if image data are included in the data, any audio data converted into analog data will be sent to the output device.

Further, output of image data may be switched to other image data. Alternatively, another image may be superimposed on the previous image.

In the description thus far, reference has been made to a case where the balance is managed by the charge data storage portion 8 within the SD circuit 3. However, this charging value balance data may be managed by the control center 31. In this case, as the charging value balance data are output to the outside of the data reproducing device 105, the control CPU 3 will encrypt the charging value balance data using the DES 7 so as to increase security and report it as encrypted data to the control center 31 through a telephone line.

The control center 31 will, in accordance with the charging value balance data received from the data reproducing device 105, accept fees corresponding to the used amount from the end user's account at a financial institution 32 and send them to the account of the data provider.

Thus, according to the present invention, since not only data stored in a CD-ROM but also user data generated by operating the data are output to the outside after being encrypted, it is possible to prevent illegal use of data performed by changing the user data.

(SECURITY GUARANTEE OF SHIPPED DATA)

Since there is a possibility that at the data distribution channel, viruses, etc., may be mixed with the data, the end user may reproduce data which includes viruses, whereby the hardware or data he has stored will be damaged and he will even be charged for data which cannot operate normally because of viruses.

Figure 9:
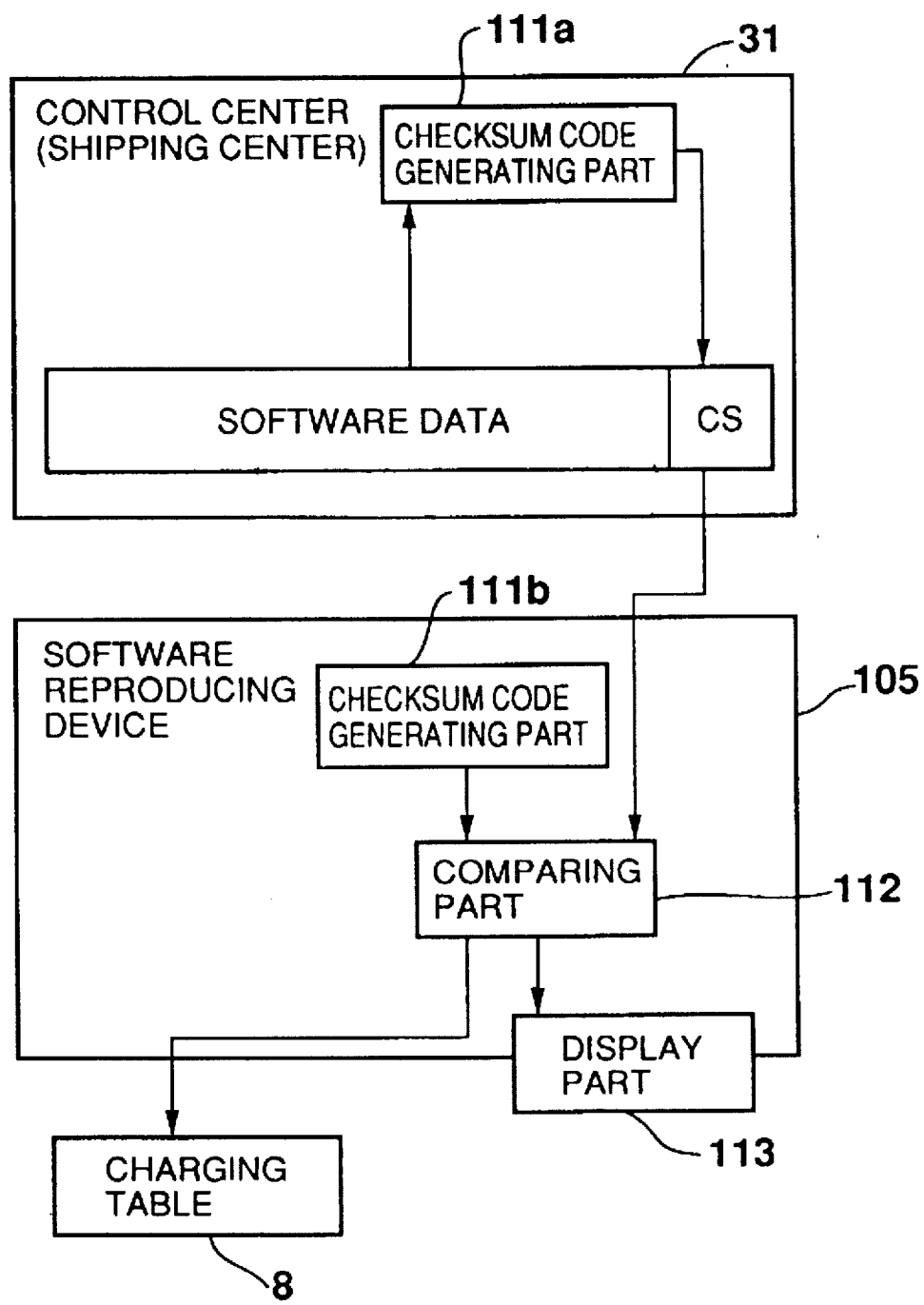
FIG. 9 is a block diagram showing a mechanism for confirming the safety guarantee of data to be reproduced in the present embodiment.

FIG. 9 shows a structure capable of detecting the incursion of viruses at the distribution channel of the data reproducing device 105.

Specifically, the control center 31 is provided with a check-sum generating portion 111a. This check-sum generating portion 111a is provided with a function for generating check-sums (CS) from data to be shipped, i.e., codes for checking data security, and in the present embodiment function codes by a hash function are output as check-sums (CS).

Figure 11:
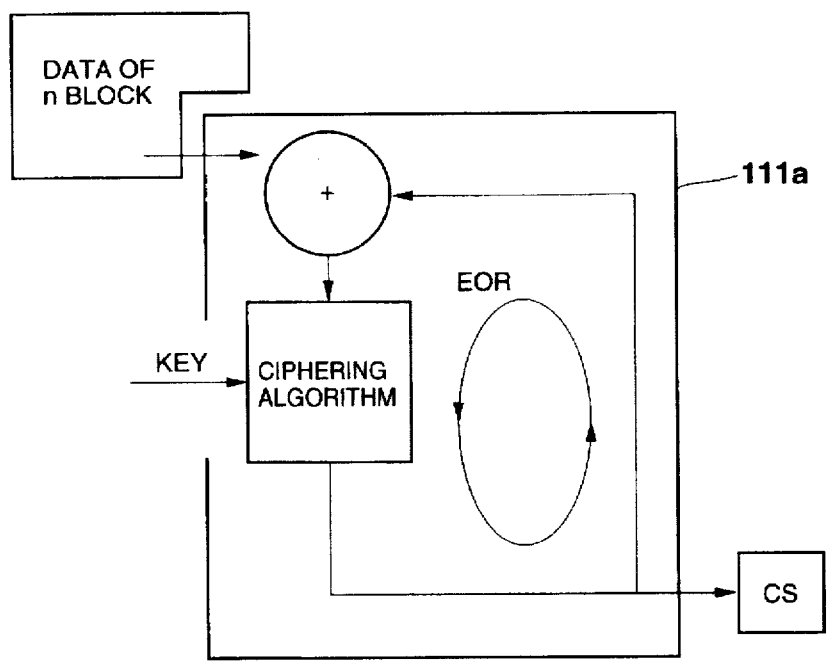
FIG. 11 is a block diagram showing the function of a check-sum generating portion in the present embodiment.

The logic of this check-sum generating portion 111a is shown in FIG. 11. That is, in the case where an operation by DES encrypting is executed, basically a CBC mode (FIG. 4B) will be adopted, programs or data will be divided by 1 block units, the data once output by the CBC mode (block return) will be returned and input as they are, and exclusive OR control (EOR) will be executed with the next input block. This result will be subjected to DES encrypting again and the output thereof will be returned to the input side, similarly to the above case. Then, when the last block is input, converted and encrypted output will be used as a check-sum (CS).

Figure 10:
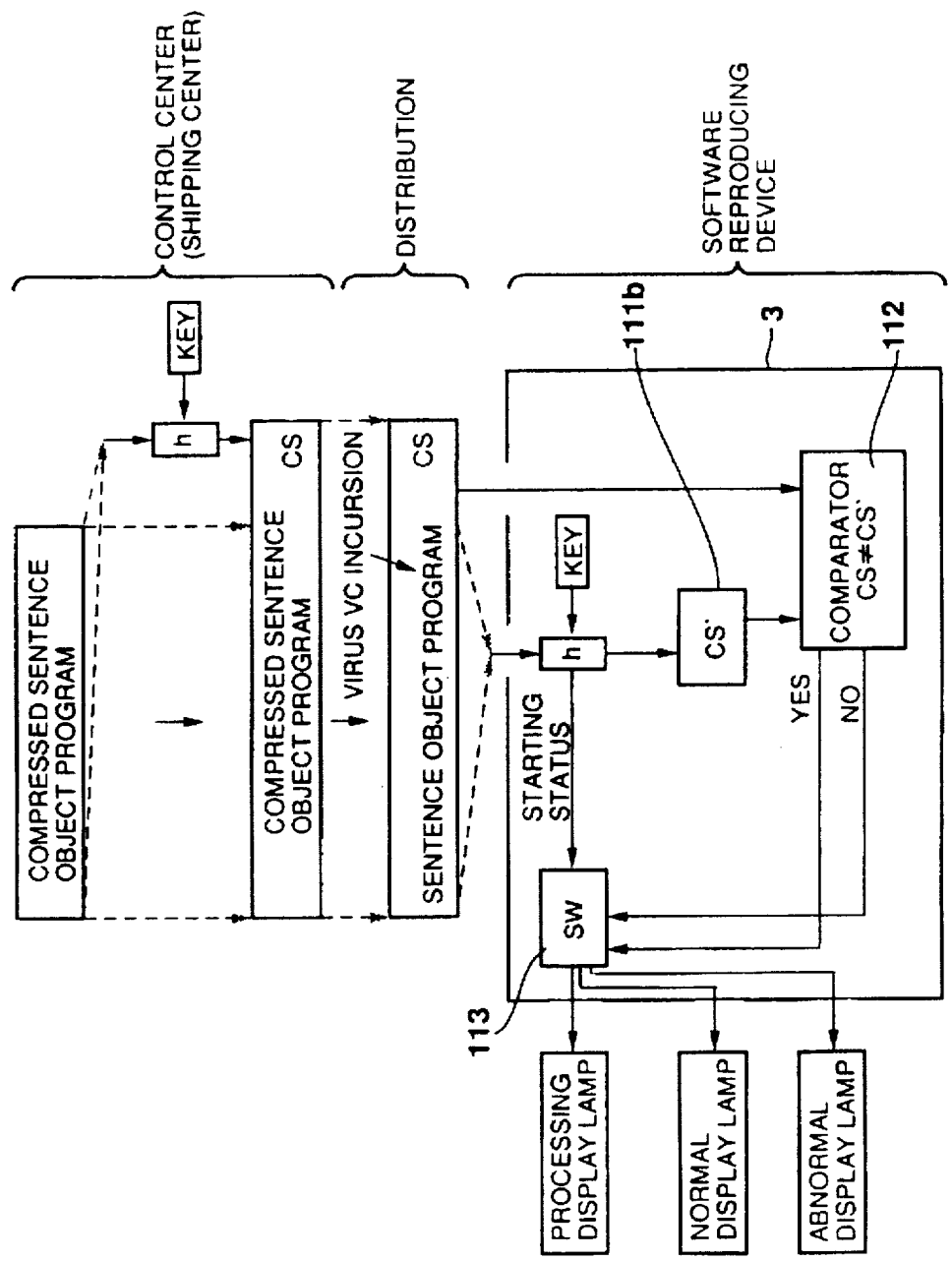
FIG. 10 is a block diagram showing a data structure for confirming the safety guarantee of data to be reproduced in the present embodiment.

FIG. 10 is a view showing a procedure wherein after a source program is converted into an object by a compiler it is compressed and this compressed sentence object program is input to a hash function h (processed at the check-sum generating portion 111a), a check-sum (CS) is obtained, and this is combined with the compressed sentence object program.

Where computer viruses are mixed when such a encrypted program passes through the distributing channel, by using a mechanism described hereinbelow in the data reproducing device 105, virus incursion can be easily confirmed.

More specifically, the data reproducing device 105 is provided with a check-sum generating portion 111b similar to the 111a, and a check-sum (CS') is generated from data by the same method as mentioned above. Then, at a comparing portion 112 the check-sum (CS) attached to the data and the check-sum (CS') newly generated at the check-sum generating portion 111b are compared.

At this time, when viruses are mixed into the data passing through the distribution channel and the data is changed, the check-sum (CS') generated at the check-sum generating portion 111b will naturally be different from the original check-sum (CS).

Thus, when the comparing portion 112 detects an abnormal comparison result, a red color indicating abnormality is displayed on the display portion 113. This display can be easily realized by providing a display lamp 113 on one end of the data management module 102 (see FIG. 24) constructed, for example, in card form, allowing changing display states by means of a switch (SW). During the processing of the check-sum generating portion 111b a yellow color will be displayed indicating that it is now engaged in processing, and when the comparing result ends substantially normally, a blue color will be displayed.

Then, only when the comparison process at the comparing portion 112 ends normally, amount-base charging will be executed from the charge data storage portion 8. More specifically, the authorization control portion 108 (not shown in FIG. 9) will perform subtraction from the count value of the charge data storage portion 8.

The relationship between check-sum generation and encrypting explained with reference to FIGS. 9 and 10 is shown in FIGS. 13 to 22 in further detail. In these drawings, it is assumed that data are stored in a CD-ROM and supplied from the data providers (control center) to the end users (data reproducing device).

Figure 13:
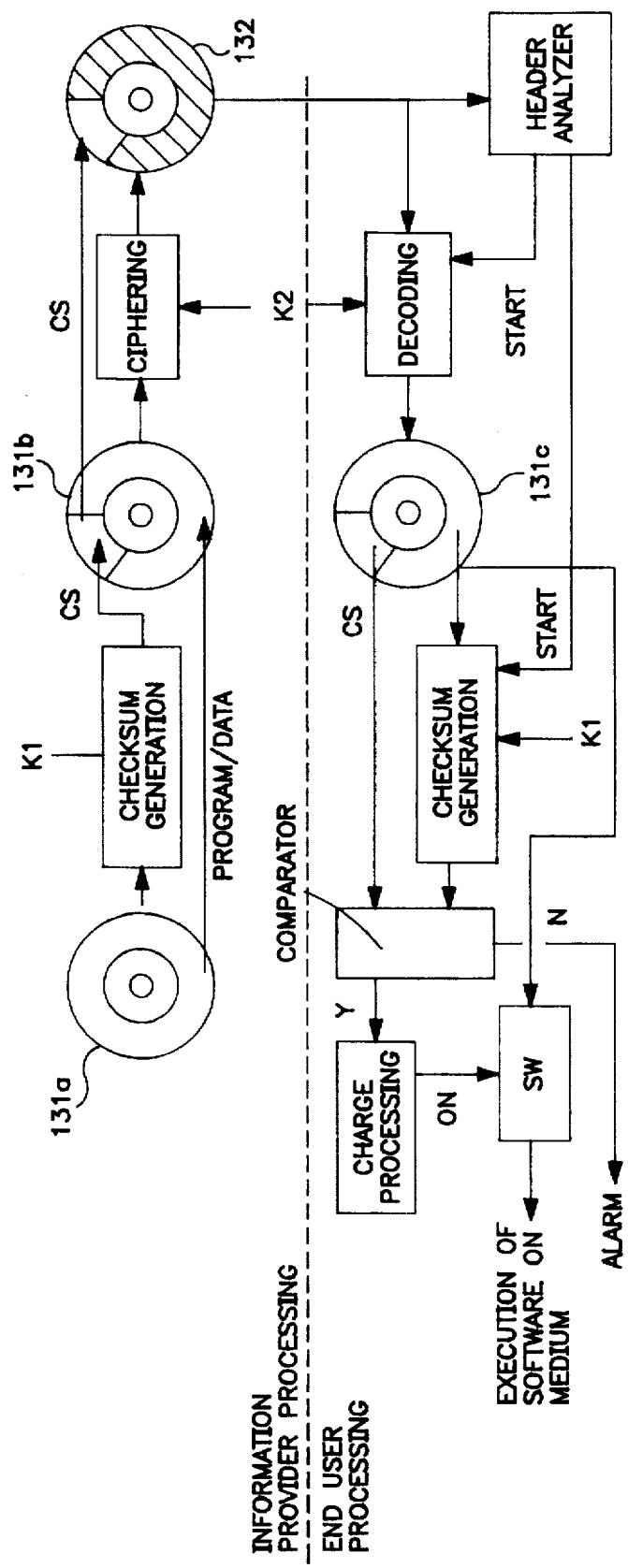
FIG. 13 is a block diagram showing encrypting or check-sum sharing between a control center and a data reproducing device.

In FIG. 13, the object indicated numerals 131a, 131b and 131c mean a logical medium formed in device (RAM or Hard disk etc.). Contrarily, the object indicated numeral 132 means a physical medium which includes a CD-ROM, an MO, a Write-once DVD or an IC card etc.

A check-sum (CS) is generated from the data (stored in RAM or Hard disk, etc.) of a sentence using key data (K1) and this is stored in a specified area of the CD-ROM. Then, the sentence data is encrypted using key data (K2) and stored in an area other than the one storing the check-sum (CS) on the CD-ROM, and this is provided to the end user. The end user decodes the encrypted data by the key data (K2) while executing header analyzing and stores it in a memory or other storage means temporarily. Then, a check-sum is generated from the decoded sentence data using the key data (K1) and this is compared with the check-sum read from the CD-ROM. Then, only when they coincide will a charging process be executed.

Figure 14:
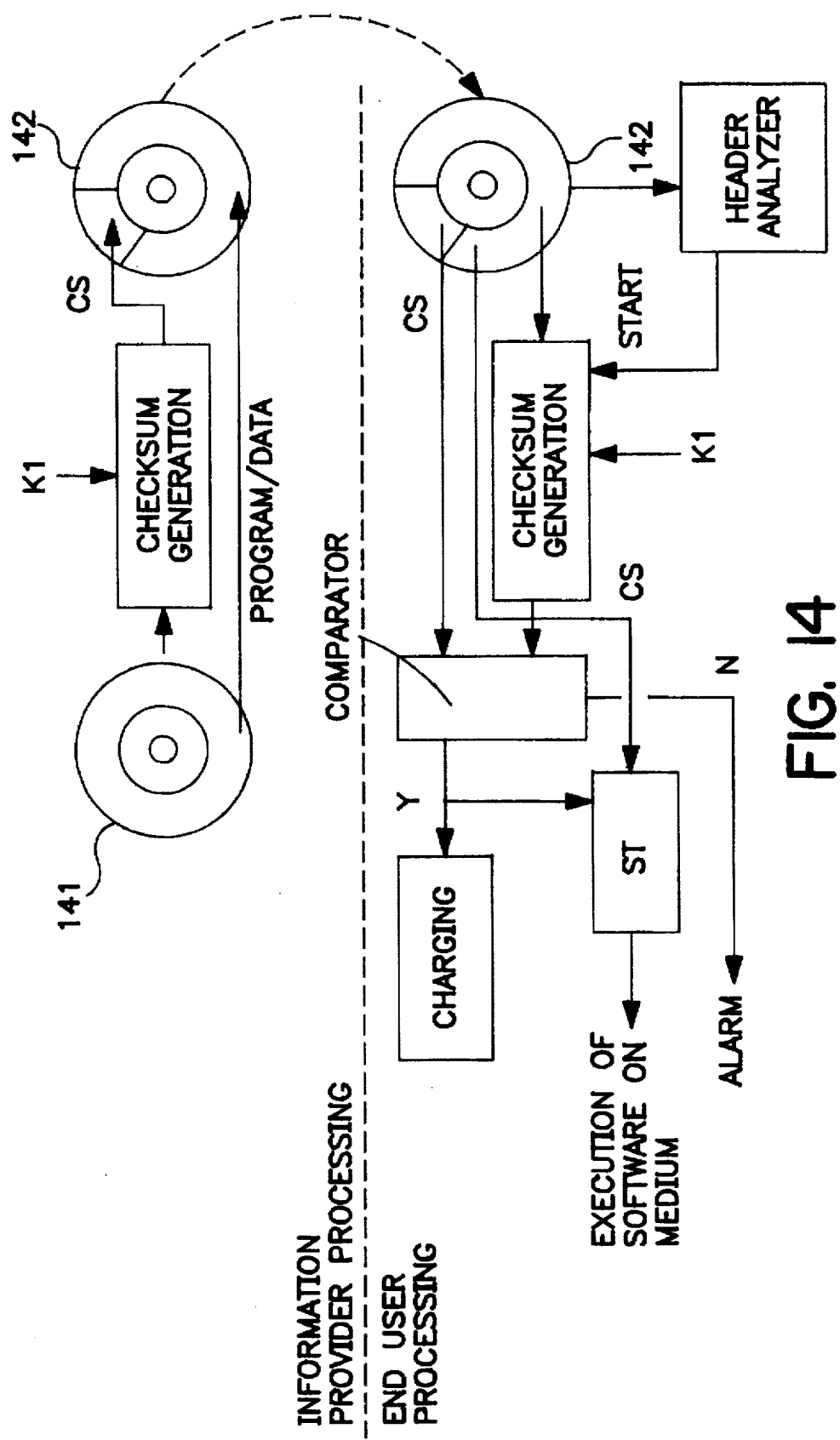
FIG. 14 is a block diagram showing encrypting or check-sum sharing between a control center and a data reproducing device.

FIG. 14 shows a case where in the example in FIG. 13 encrypting processing is not carried out at the data provider (control center).

In FIG. 14, the object indicated numeral 141 means a logical medium formed in a device (RAM or Hard disk etc.).

Contrarily, the object indicated numeral 142 means a physical medium which includes a CD-ROM, an MO, a Write-once DVD or an IC card etc.

Figure 15:
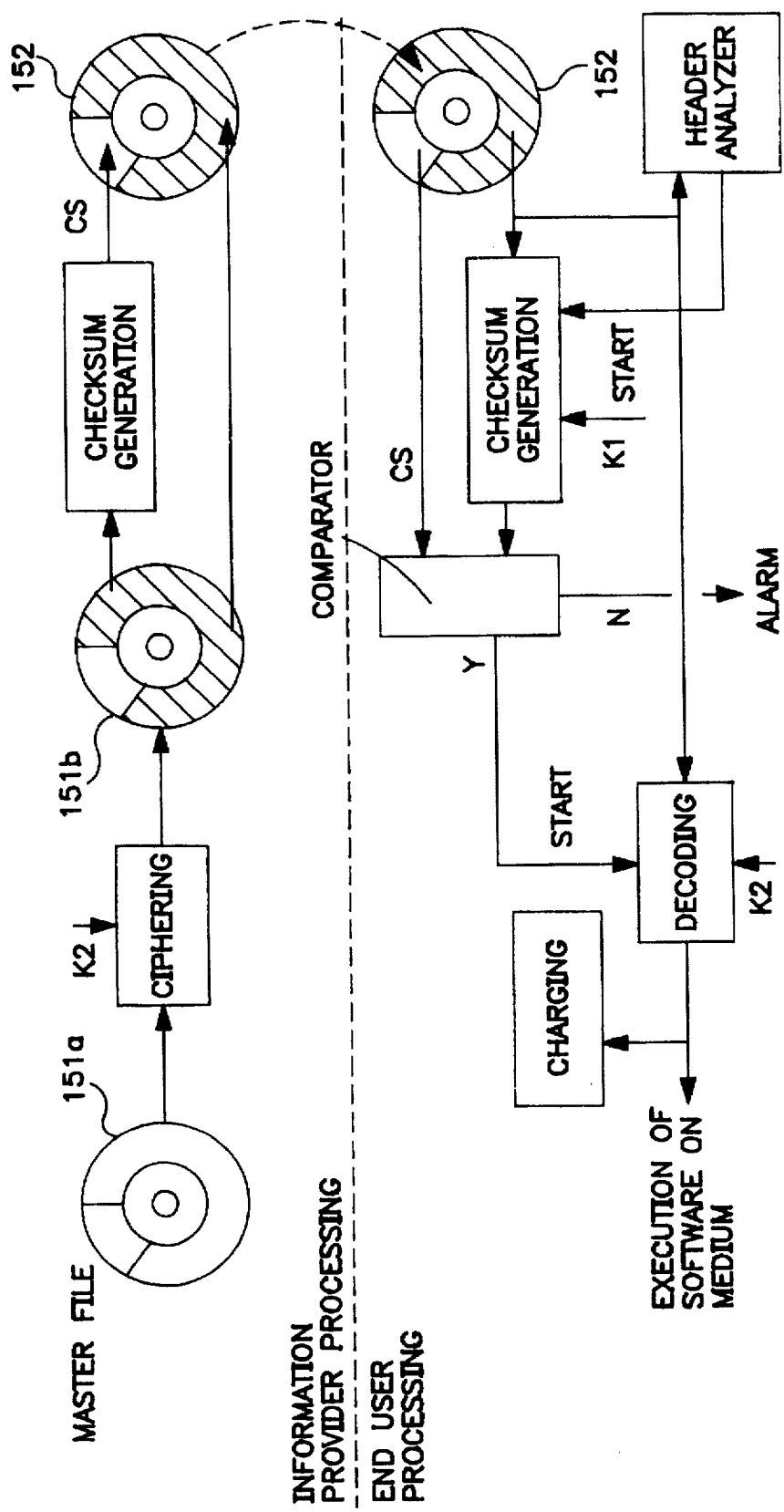
FIG. 15 is a block diagram showing encrypting or check-sum sharing between a control center and a data reproducing device.

In FIG. 15, the object indicated numerals 151a and 151b mean a logical medium formed in a device (RAM or Hard disk etc.). Contrarily, the object indicated numeral 152 means a physical medium which includes a CD-ROM, an MO, a Write-once DVD or an IC card, etc.

As shown in FIG. 15, a check-sum is generated from the encrypted data (data). That is, the sentence data is first encrypted by the key data (K2) and this is stored in the CD-ROM. Then, a check-sum is generated for the encrypted data, and this is stored in a specified area and supplied to the end user.

At the end user side, while executing header analyzing a check-sum is directly generated from the encrypted data, and this check-sum is compared with the one stored in the CD-ROM.

Figure 16:
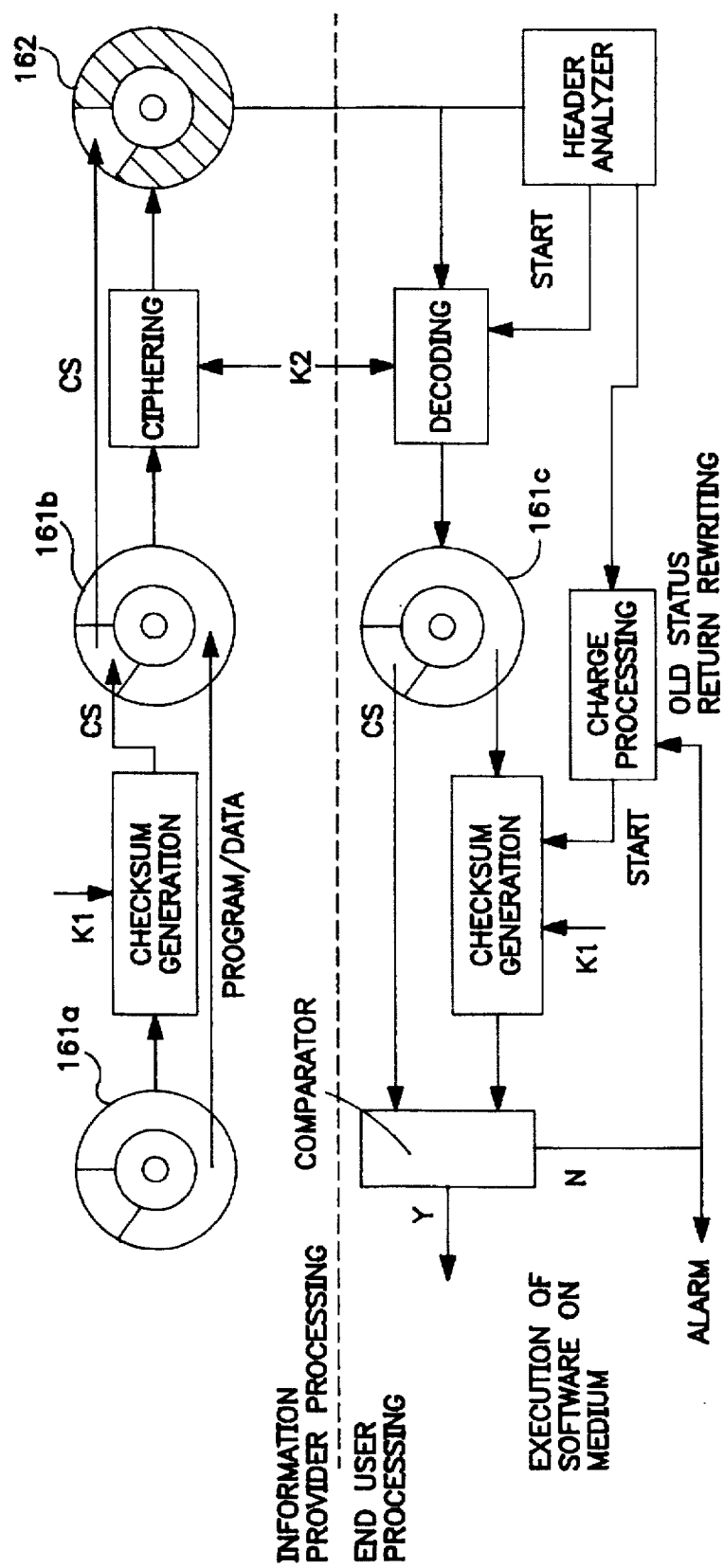
FIG. 16 is a block diagram showing encrypting or check-sum sharing between a control center and a data reproducing device.

In FIG. 16, the object indicated numerals 161a, 161b and 161c mean a logical medium formed in a device (RAM or Hard disk etc.). Contrarily, the object indicated numeral 162 means a physical medium which includes a comprised CD-ROM, an MO, a Write-once DVD or an IC card, etc.

Though processing at the data provider (control center) side is similar to that shown in FIG. 13, the charging process at the end user side (data reproducing device side) is different. That is, the charging process is started as a result of header analyzing, and if the result of comparing the check-sums shows that they do not coincide, the charging process will be invalidated (old status return rewriting).

Figure 17:
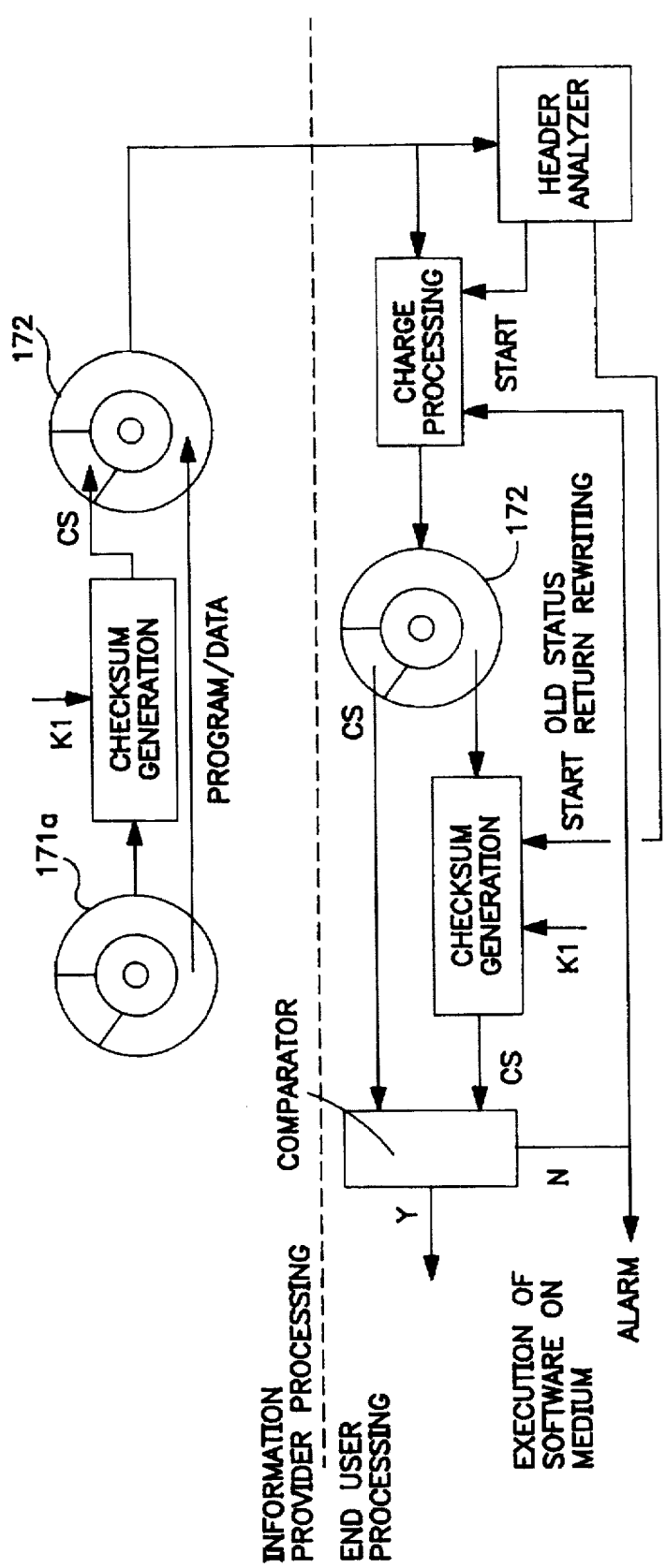
FIG. 17 is a block diagram showing encrypting or check-sum sharing between a control center and a data reproducing device.

In FIG. 17, the object indicated numeral 171a means a logical medium formed in a device (RAM or Hard disk etc.). Contrarily, the object indicated numeral 172 means a physical medium which includes a CD-ROM, an MO, a Write-once DVD or an IC card etc.

Though processing at the data provider side (control center) is similar to that shown in FIG. 14, a charging process at the end user side (data reproducing side) is different. That is, the charging process is started as a result of header analyzing, and if the result of comparing the check-sums shows that they do not coincide, the charging process will be invalidated (old status return rewriting).

Figure 18:
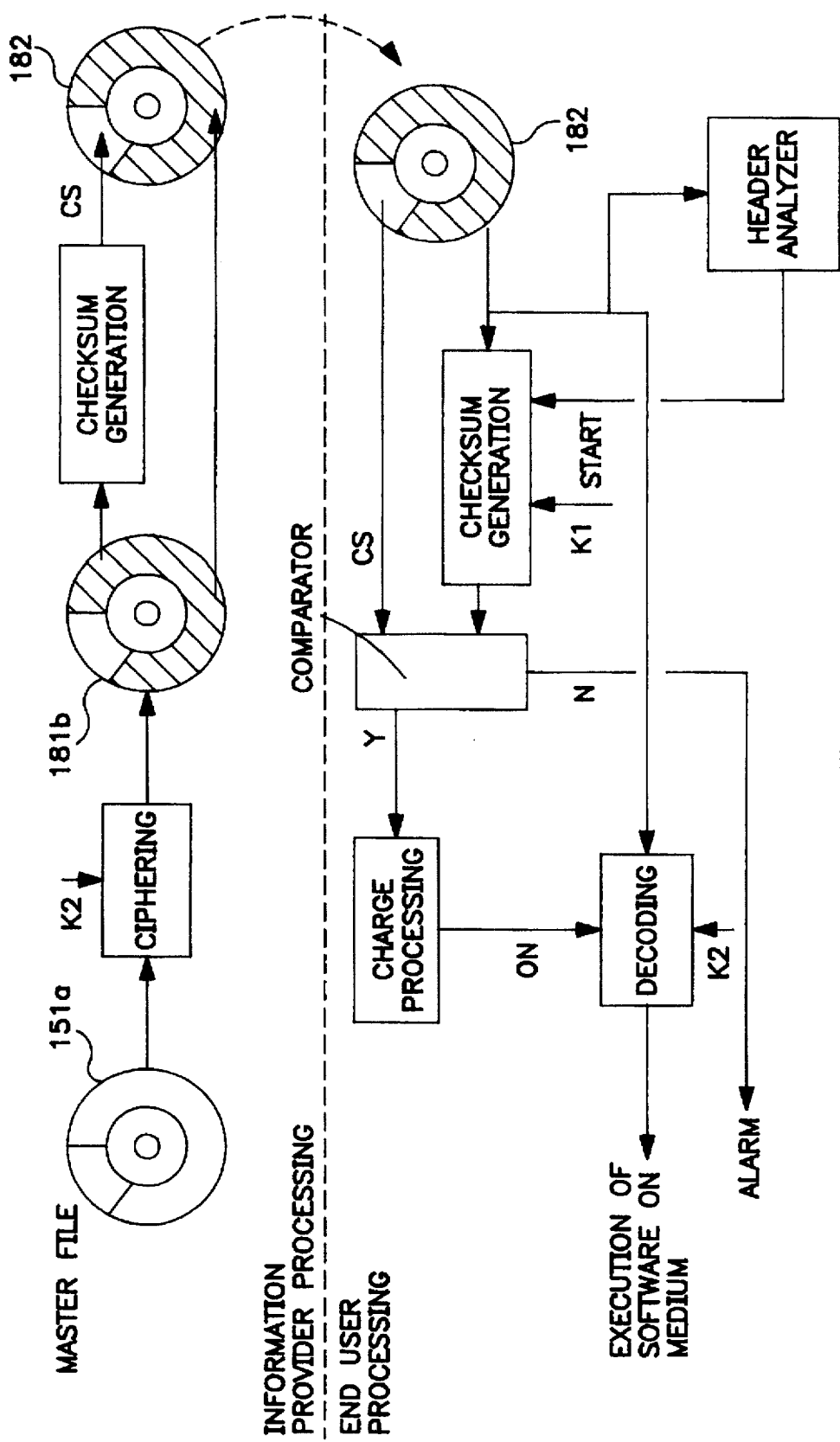
FIG. 18 is a block diagram showing encrypting or check-sum sharing between a control center and a data reproducing device.

In FIG. 18, the object indicated numerals 181a and 181b mean a logical medium formed in a device (RAM or Hard disk etc.). Contrarily, the object indicated numeral 182 means a physical medium which includes a CD-ROM, an MO, a Write-once DVD or an IC card, etc.

Though a processing at the data provider side (control center) is similar to the one shown in FIG. 15, a charging process at the end user side (data reproducing device side) is different. That is, the charging process is executed based on the result of comparison, and by this charging process decoding will be started.

Figure 19:
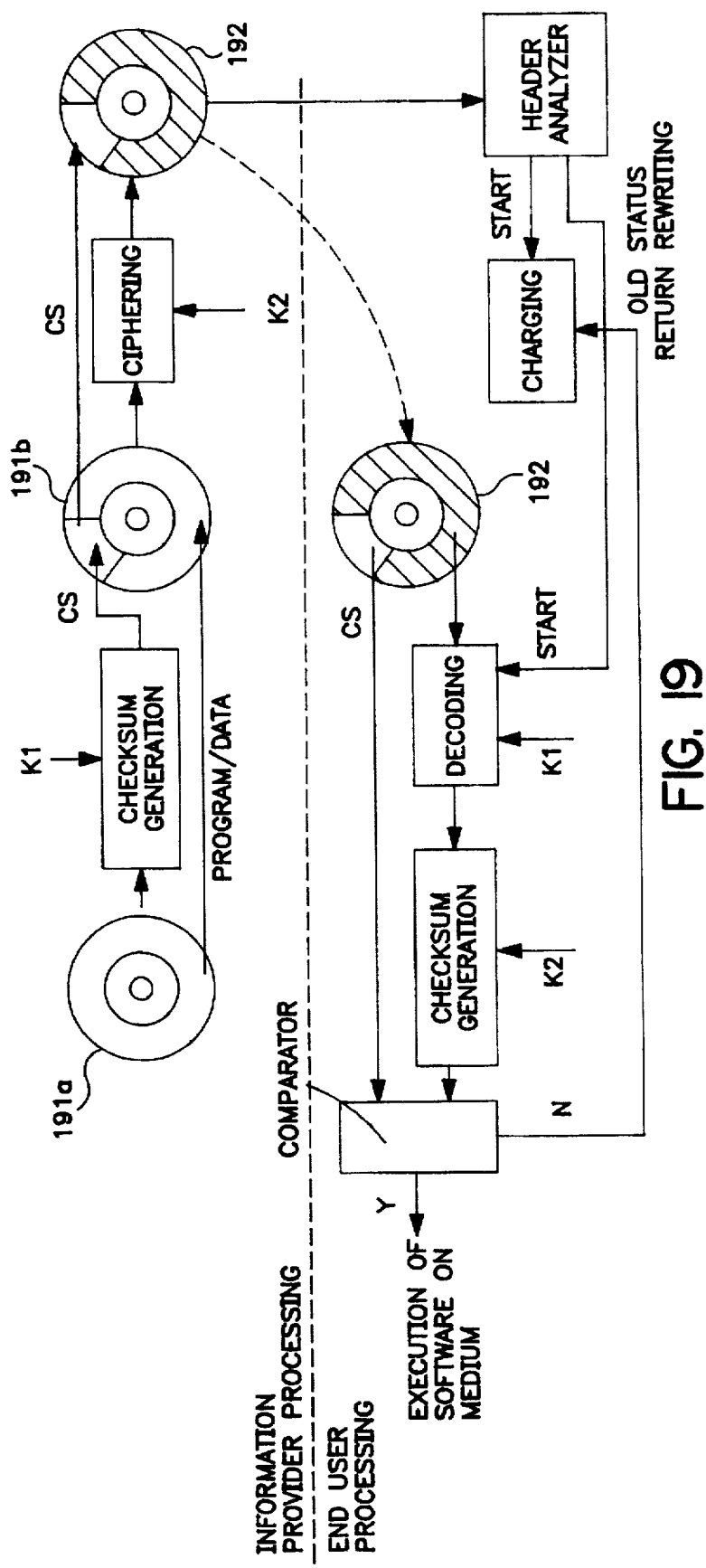
FIG. 19 is a block diagram showing encrypting or check-sum sharing between a control center and a data reproducing device.

In FIG. 19, the object indicated numerals 191a and 191b mean a logical medium formed in a device (RAM or Hard disk etc.). Contrarily, the object indicated numeral 192 means a physical medium which includes a CD-ROM, an MO, a Write-once DVD or an IC card, etc.

Though a processing at the data provider side (control center) is similar to the one shown in FIG. 16, a charging process at the end user side (data reproducing device side) is different. That is, the charging process is started based on the result of header analyzing, and if the result of comparing the check-sums shows that they do not coincide, the charging process will be invalidated (old status return rewriting).

Figure 20:
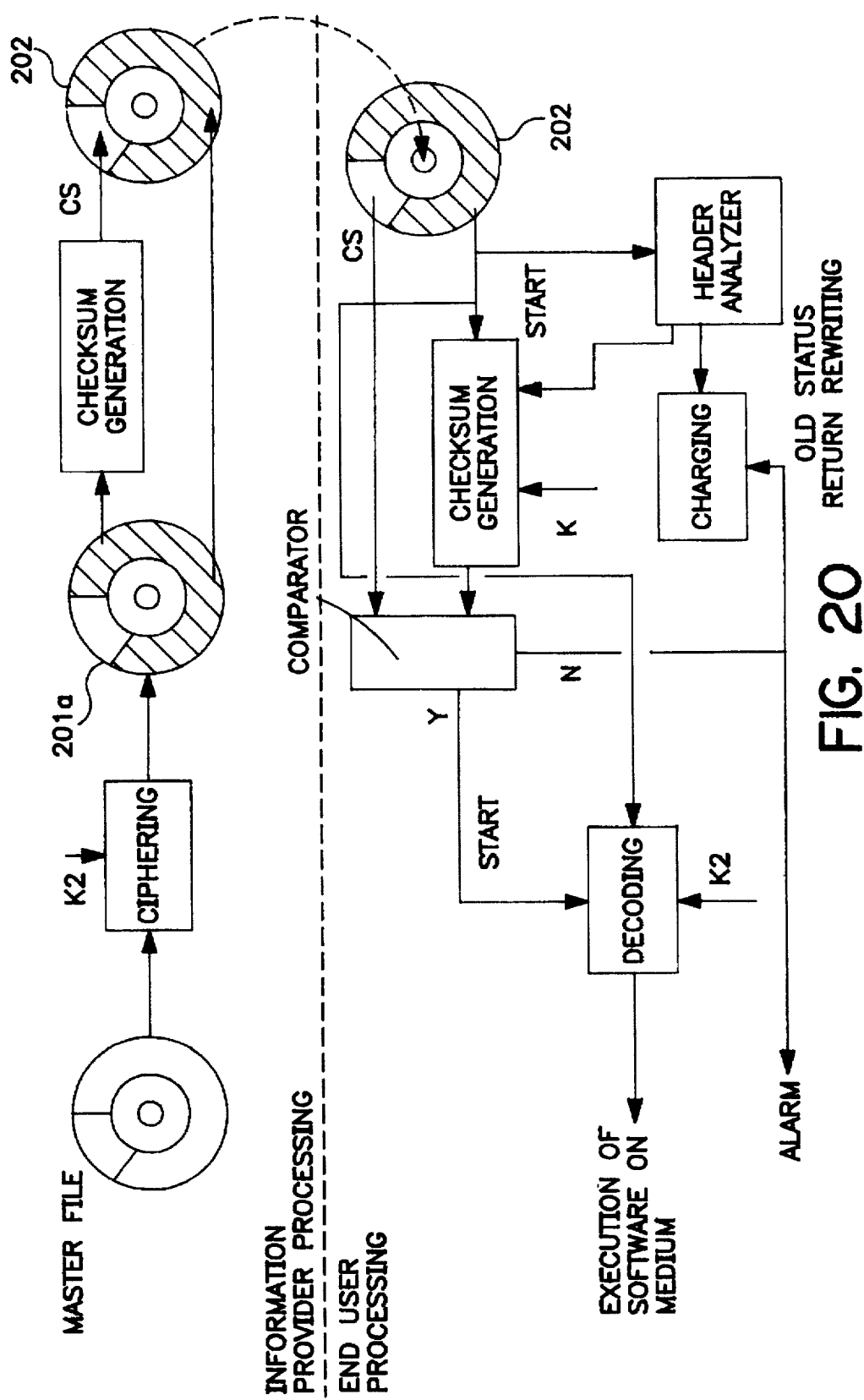
FIG. 20 is a block diagram showing encrypting or check-sum sharing between a control center and a data reproducing device.

In FIG. 20, the object indicated numeral 201a means a logical medium formed in a device (RAM or Hard disk etc.). Contrarily, the object indicated numeral 202 means a physical medium which includes a CD-ROM, an MO, a Write-once DVD or an IC card etc.

Though a processing at the data provider side (control center) is similar to the one shown in FIG. 15, a charging process at the end user side (data reproducing device side) is different. That is, the charging process is started as a result of header analyzing, and if the result of comparing the check-sums shows that they do not coincide, the charging process will be invalidated (old status return rewriting).

Figure 21:
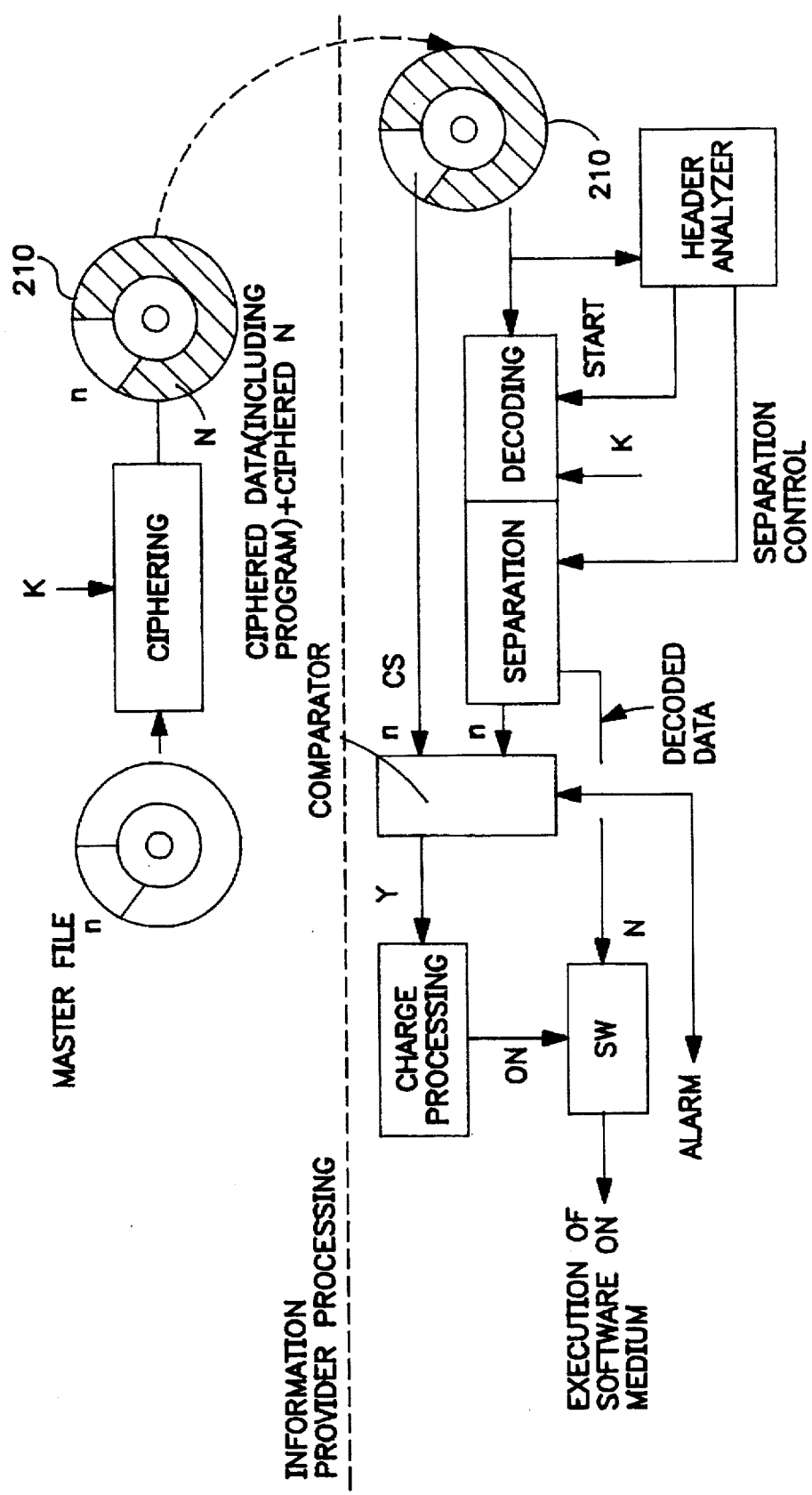
FIG. 21 is a block diagram showing encrypting or check-sum sharing between a control center and a data reproducing device.
Figure 22:
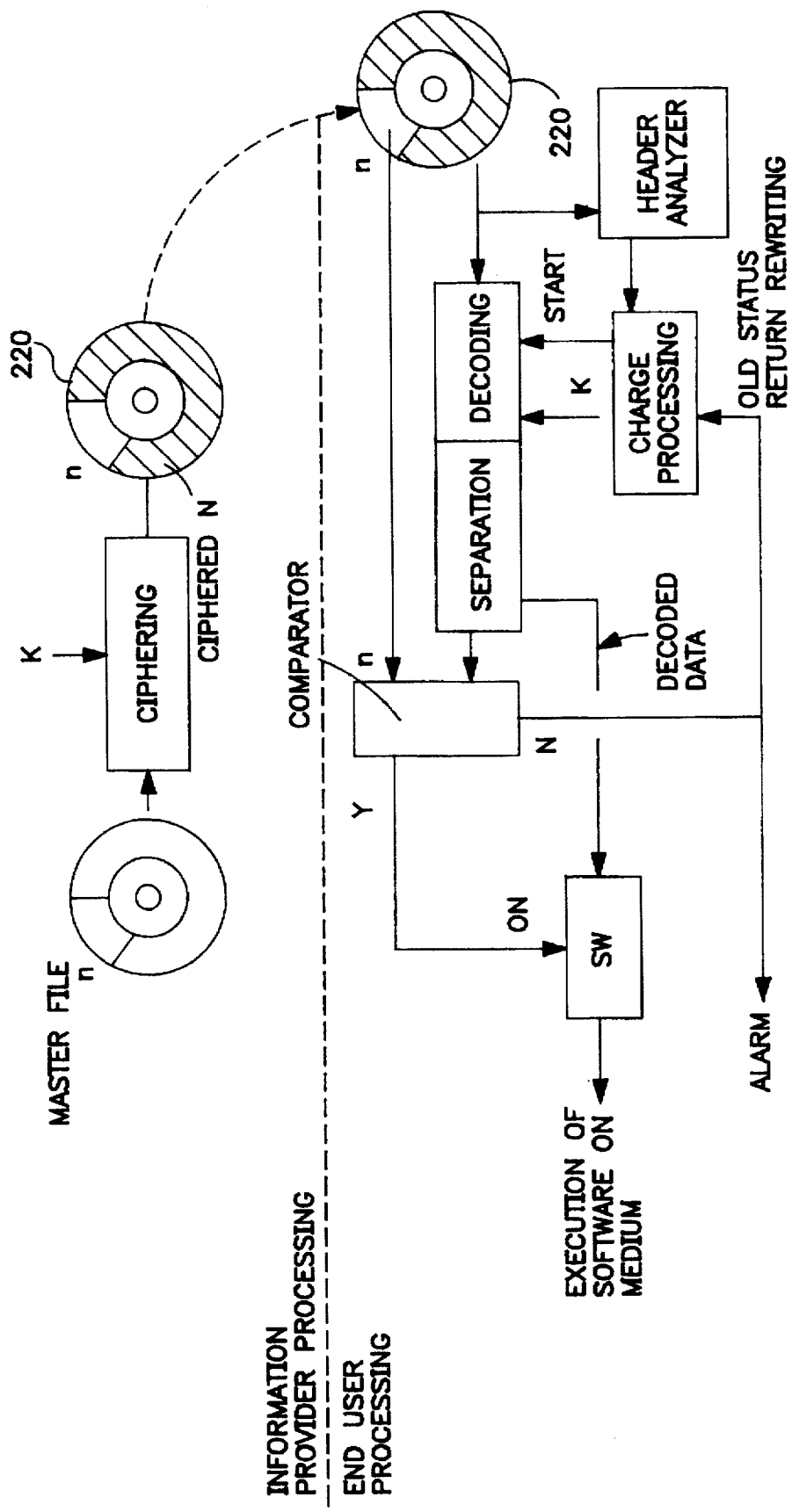
FIG. 22 is a block diagram showing encrypting or check-sum sharing between a control center and a data reproducing device.

In FIGS. 21 and 22, the object indicated numerals 210 and 220 means a physical medium which includes a CD-ROM, an MO, a Write-once DVD or an IC card, etc.

A charging process is started at the same time of header analyzing, and if the result of comparison shows that they do not coincide, the charging process will be invalidated (old status return rewriting).

As described above, in the examples shown in FIGS. 9 to 22, as it is easy to confirm data security, it is possible to prevent damage to hardware or data and unfair charging generated by reproducing data with viruses mixed therein.

(DATA LENDING TIME MANAGEMENT BY CONTROL CENTER)

A case where data utilization time management is operated by the control center 31 will be described hereinbelow.

The control center 31 issues authorization commands to the data reproducing device 105, encrypts utilization starting time (time stamp) corresponding to software, and sends it to the data reproducing device 105 through communication lines (or via modem).

In the data reproducing device 105, when this time stamp is received, it is decoded by its own SD circuit 3 and written in the charge data storage portion 8. At this time, as shown in FIG. 23, if a charge data balance value is set for each software, the time stamp will be written corresponding to the software ID.

In this way, by managing time stamps it will be made possible to manage the data utilization period of the end user.

Further, encrypted time stamps may be transferred to the end user orally by the operator at the control center 31, and the end user may input these to his own data reproducing device 105 from the keyboard. At this time, if the user illegally changes the time stamps, this will be detected by the control CPU 4 of the SD circuit 3 and decoding of the software will be rejected.

Thus, as the time stamps are encrypted and appear to the users as merely meaningless numeral strings, analyzing will be difficult and charging security will be maintained.

Furthermore, in the embodiment described above, naturally data to be provided to the data reproducing device 105 may be not only those stored in such tangible media as CD-ROM or the like but also those obtained as communication data from host computers via high-speed communication systems.

What is claimed is:

1. A data management module mounted on a data reproducing device for selecting and reproducing encrypted data, comprising:

input means for inputting said encrypted data;

authorization control means for authorizing decoding of said encrypted data;

decoding means for decoding said encrypted data authorized by said authorization control means; and charge data storage means for storing a balance value, wherein said authorization control means reduces the balance value based upon characteristics of said encrypted data decoded by said decoding means, compares the balance value with a predetermined cutoff value, and authorizes the decoding of additional encrypted data based upon the comparison, an initial value of said balance value being resettable through commands from a source external of said data management module, output means for outputting said decoded encrypted data decoded by said decoding means.

2. The data management module according to claim 1, wherein said authorization control means authorizes decoding of specified data from a data storing medium.

3. The data management module according to claim 1, further comprising encrypting means, wherein said authorization control means encrypts user data by said encrypting means when outputting to the exterior user data generated or processed by a decoding process.

4. The data management module according to claim 3, wherein said user data is charge data.

5. The data management module according to claim 1, wherein said decoding means comprises mode identifying means for changing encrypting utilization modes for decoding said encoupled data in accordance with the characteristics of said encrypted data.

6. The data management module according to claim 1, wherein said decoding means comprises:

an input register disposed on an input side;

decoding execution means for executing encrypting or decoding of input data by a specified logic;

an intermediate register;

a selector placed between said input register and said intermediate register, for selectively outputting an output from either one of said input register or said decoding execution means to said intermediate register; and an output buffer provided at a next stage of said decoding execution means, for sequentially outputting decoded data from said intermediate register.

7. The data management module according to claim 6, wherein at least one of said input register and said output buffer is a shift register.

8. A data reproducing device for reproducing data from a data storage medium, comprising:

a driving device for reading encrypted data from the data storage medium storing said encrypted data;

demodulation means for demodulating said encrypted data read by said driving device;

a data management module including input means for inputting said encrypted data, authorization control means for authorizing demodulation of said encrypted data, decoding means for decoding said encrypted data authorized by said authorization control means and input by said input means, charge data storage means for storing a balance value, wherein said authorization control means reduces the balance value based upon characteristics of said encrypted data decoded by said decoding means, compares the balance value with a predetermined cutoff value, and authorizes the decoding of additional encrypted data based upon the comparison, an initial value of said balance value being resettable through comments from a source external of said data management module, and output means for outputting decoded encrypted data decoded by said decoding means from said management module.

9. The data reproducing device according to claim 8, further comprising a card driving device to which a card medium incorporating said data management module is attached.

10. A data reproduction management system, comprising a control center and a data reproducing device, wherein:

said control center includes authorization command issuing means for issuing key data as an authorization command for utilization requests from said data reproducing device encrypted data, and charge data storage means for storing a balance value, wherein said authorization command issuing means reduces the balances value based upon characteristics of said encrypted data and compares the balance value with a predetermined cut off value;

said data reproducing device includes decoding means for decoding the encrypted data from a data storage medium based on said key data, wherein said authorization command issuing means authorizes the decoding of the additional encrypted data based upon the comparison.

11. The data reproduction management system according to claim 10, wherein said charge data storing means stores charge data of a user, and said data reproducing device includes encrypting means for encrypting the charge data when the charge data is reported to said control center.

12. The data reproduction management system according to claim 10, wherein said control center includes data security detecting means for detecting security relating to encrypted or non-encrypted data.

13. The data reproduction management system according to claim 10, wherein:

said control center includes transmission side check-sum generating means for generating check-sums from said encrypted or non-encrypted data; and said data reproducing device includes reception side check-sum generating means for receiving said data and a check-sum from said control center and generating a check-sum from said encrypted or non-encrypted data, and comparing means for comparing a check-sum generated by said reception side check-sum generating means and said check-sum received from said control center.

14. The data reproduction management system according to claim 13, wherein said control center includes encrypting means for encrypting said non encrypted data, and said transmission side check-sum generating means generates check-sums with respect to data before being encrypted by said encrypting means or to data after being encrypted.

15. The data reproduction management system according to claim 13, wherein said reproducing device comprises a data management module including said decoding means, reception side check-sum generating means, and comparing means and further comprises display means for displaying the comparison result of said comparing means.

16. The data reproduction management system according to claim 13, wherein said comparing means executes amount-based charging with respect to said charge data storage means only when both of said check-sums are equal to each other.

* * * * *